US010516431B2

(12) United States Patent
DiLella

(10) Patent No.: US 10,516,431 B2
(45) Date of Patent: Dec. 24, 2019

(54) MOBILE DEVICE CASE FOR RECEIVING WIRELESS SIGNALS

(71) Applicant: MOPHIE INC., Tustin, CA (US)

(72) Inventor: Mark Stephen DiLella, Irvine, CA (US)

(73) Assignee: mophie inc., Irvine, CA (US)

( * ) Notice: Subject to any disclaimer, the term of this patent is extended or adjusted under 35 U.S.C. 154(b) by 0 days.

(21) Appl. No.: 15/820,197

(22) Filed: Nov. 21, 2017

(65) Prior Publication Data

US 2019/0158136 A1 May 23, 2019

(51) Int. Cl.
*H04B 1/3888* (2015.01)
*H02J 7/02* (2016.01)
*H02J 7/00* (2006.01)
*H02J 50/10* (2016.01)
*H02J 50/90* (2016.01)

(52) U.S. Cl.
CPC .......... *H04B 1/3888* (2013.01); *H02J 7/0044* (2013.01); *H02J 7/025* (2013.01); *H02J 50/10* (2016.02); *H02J 7/0047* (2013.01); *H02J 50/90* (2016.02); *H02J 2007/0062* (2013.01); *H02J 2007/0096* (2013.01)

(58) Field of Classification Search
CPC ............................... H04B 1/3888; H02J 7/025
USPC .......................................................... 455/573
See application file for complete search history.

(56) References Cited

U.S. PATENT DOCUMENTS 3,851,126 A 11/1974 Keller
4,028,515 A 6/1977 Desio et al.
D267,795 S 2/1983 Mallon
4,479,596 A 10/1984 Swanson
4,515,272 A 5/1985 Newhouse
(Continued)

FOREIGN PATENT DOCUMENTS

CN 2506579 8/2002
CN 201033643 3/2008
(Continued)

OTHER PUBLICATIONS

Reexamination Control No. 90/013,319 including its prosecution history, filed Sep. 18, 2014, Huang et al.
(Continued)

*Primary Examiner* — Eugene Yun
(74) *Attorney, Agent, or Firm* — Knobbe, Martens, Olson & Bear, LLP

(57) ABSTRACT

A wireless case for use with a mobile electronic device can include a back wall, a top wall, a bottom wall, a right side wall, a left side wall. The case can include a wireless receiver configured to receive wireless signals. The case can further include a device interface that can be electrically coupled to the wireless receiver. The device interface can move between an engaged position and a disengaged position. In the engaged position, the device interface can be configured to engage a corresponding interface on the mobile electronic device to deliver the electrical signals from the wireless receiver to the mobile electronic device. In the disengaged position the device interface can be configured to disengage from the corresponding interface on the mobile electronic device to facilitate insertion of the mobile electronic device into the case or removal of the mobile electronic device from the case.

32 Claims, 10 Drawing Sheets

(56) References Cited

U.S. PATENT DOCUMENTS

D284,372 S 6/1986 Carpenter
4,951,817 A 8/1990 Barletta et al.
D312,534 S 12/1990 Nelson et al.
5,001,772 A 3/1991 Holcomb et al.
D322,719 S 12/1991 Jayez
D327,868 S 7/1992 Oka
5,360,108 A 11/1994 Alagia
5,368,159 A 11/1994 Doria
5,383,091 A 1/1995 Snell
5,386,084 A 1/1995 Risko
D357,918 S 5/1995 Doria
5,508,123 A 4/1996 Fan
D372,896 S 8/1996 Nagele et al.
5,586,002 A 12/1996 Notarianni
5,604,050 A 2/1997 Brunette et al.
5,610,979 A 3/1997 Yu
D384,327 S 9/1997 Nakui
5,708,707 A 1/1998 Halttlunen et al.
5,711,013 A 1/1998 Collett et al.
D392,248 S 3/1998 Johansson
D392,939 S 3/1998 Finke-Anlauff
5,786,106 A 7/1998 Armani
5,816,459 A 10/1998 Armistead
D400,495 S 11/1998 Deslyper et al.
D400,496 S 11/1998 Barber et al.
5,859,481 A 1/1999 Banyas
5,864,766 A 1/1999 Chiang
D405,801 S 2/1999 Nagele et al.
D407,063 S 3/1999 Reis et al.
5,876,351 A 3/1999 Rohde
D407,708 S 4/1999 Nagele et al.
5,896,277 A 4/1999 Leon et al.
5,932,855 A 8/1999 Wang et al.
5,959,433 A 9/1999 Rohde
5,973,477 A 10/1999 Chang
D417,189 S 11/1999 Amero, Jr. et al.
6,043,626 A 3/2000 Snyder et al.
6,051,957 A 4/2000 Klein
D424,512 S 5/2000 Ho
6,069,332 A 5/2000 Suchanek et al.
6,081,595 A 6/2000 Picaud
D428,019 S 7/2000 Amron
6,082,535 A 7/2000 Mitchell
6,171,138 B1 1/2001 Lefebvre et al.
D438,004 S 2/2001 Watson et al.
6,184,654 B1 2/2001 Bachner, III et al.
D439,218 S 3/2001 Yu
6,201,867 B1 3/2001 Koike
6,208,115 B1 3/2001 Binder
6,266,539 B1 7/2001 Pardo
D446,497 S 8/2001 Yu
6,273,252 B1 8/2001 Mitchell
D447,462 S 9/2001 Kosiba
6,313,982 B1 11/2001 Hino
6,317,313 B1 11/2001 Mosgrove et al.
6,324,380 B1 11/2001 Kiuchi et al.
6,346,791 B1 2/2002 Berguirdjian
6,377,811 B1 4/2002 Sood et al.
6,405,056 B1 6/2002 Altschul et al.
D460,411 S 7/2002 Wang
D460,761 S 7/2002 Croley
6,415,138 B2 7/2002 Sirola et al.
6,434,371 B1 8/2002 Claxton
6,434,404 B1 8/2002 Claxton et al.
6,441,588 B1 8/2002 Yagi et al.
6,445,577 B1 9/2002 Madsen et al.
6,471,056 B1 10/2002 Tzeng
D469,427 S 1/2003 Ma et al.
6,536,589 B2 3/2003 Chang
6,538,413 B1 3/2003 Beard et al.
D472,384 S 4/2003 Richardson
6,552,513 B1 4/2003 Li
6,555,990 B1 4/2003 Yang
6,583,601 B2 6/2003 Simoes et al.
6,594,472 B1 7/2003 Curtis et al.
6,614,722 B2 9/2003 Polany et al.
6,626,362 B1 9/2003 Steiner et al.
D481,716 S 11/2003 He et al.
D482,529 S 11/2003 Hardigg et al.
6,646,864 B2 11/2003 Richardson
D484,874 S 1/2004 Chang et al.
D485,834 S 1/2004 Davetas
6,681,003 B2 1/2004 Linder et al.
6,701,159 B1 3/2004 Powell
6,708,887 B1 3/2004 Garrett et al.
6,714,802 B1 3/2004 Barvesten
6,785,566 B1 8/2004 Irizarry
6,794,849 B2 9/2004 Mori et al.
6,819,549 B1 11/2004 Lammers-Meis et al.
D500,041 S 12/2004 Tsujimoto
6,842,708 B2 1/2005 Odaohhara
D506,612 S 6/2005 Rosa et al.
D508,495 S 8/2005 Bone et al.
D513,123 S 12/2005 Richardson et al.
6,980,777 B2 12/2005 Shepherd et al.
D513,451 S 1/2006 Richardson et al.
6,992,461 B2 1/2006 Liang et al.
D514,808 S 2/2006 Morine et al.
D516,309 S 3/2006 Richardson et al.
D516,553 S 3/2006 Richardson et al.
D516,554 S 3/2006 Richardson et al.
D516,807 S 3/2006 Richardson et al.
D517,007 S 3/2006 Yong-Jian et al.
D520,744 S 5/2006 Pangrec et al.
7,050,841 B1 5/2006 Onda
7,059,769 B1 6/2006 Potega
7,069,063 B2 6/2006 Halkosaari et al.
D525,582 S 7/2006 Chan
7,072,699 B2 7/2006 Eiden
7,079,879 B1 7/2006 Sylvester et al.
7,081,736 B2 7/2006 Seil et al.
D526,780 S 8/2006 Richardson et al.
D526,958 S 8/2006 Shimizu
D530,079 S 10/2006 Thomas et al.
D535,252 S 1/2007 Sandnes
7,158,376 B2 1/2007 Richardson et al.
7,166,987 B2 1/2007 Lee et al.
D537,063 S 2/2007 Kim et al.
7,176,654 B2 2/2007 Meyer et al.
7,180,735 B2 2/2007 Thomas et al.
7,180,754 B2 2/2007 Qin et al.
7,194,291 B2 3/2007 Peng
D540,539 S 4/2007 Gutierrez
7,203,467 B2 4/2007 Siddiqui
D542,286 S 5/2007 Taniyama et al.
D542,524 S 5/2007 Richardson et al.
D543,541 S 5/2007 Chung et al.
D544,486 S 6/2007 Hussaini et al.
7,230,823 B2 6/2007 Richardson et al.
D547,056 S 7/2007 Griffin et al.
D547,057 S 7/2007 Griffin et al.
D550,455 S 9/2007 Barnhart
D551,252 S 9/2007 Andre et al.
7,266,391 B2 9/2007 Warren
D551,856 S 10/2007 Ko et al.
D553,857 S 10/2007 Pendergraph et al.
D556,679 S 12/2007 Weinstein et al.
D556,681 S 12/2007 Kim
D557,205 S 12/2007 Kim
D557,264 S 12/2007 Richardson et al.
D557,494 S 12/2007 Mayette et al.
D557,897 S 12/2007 Richardson et al.
7,312,984 B2 12/2007 Richardson et al.
D558,667 S 1/2008 Park et al.
D558,757 S 1/2008 Andre et al.
D558,972 S 1/2008 Oh
D558,973 S 1/2008 Hussaini et al.
D559,267 S 1/2008 Griffin
D560,229 S 1/2008 Yagi
D561,092 S 2/2008 Kim
7,336,973 B2 2/2008 Goldthwaite et al.
D563,093 S 3/2008 Nussberger
7,343,184 B2 3/2008 Rostami
D565,291 S 4/2008 Brandenburg et al.

(56) References Cited

U.S. PATENT DOCUMENTS

| | | | |
|---|---|---|---|
| 7,397,658 | B2 | 7/2008 | Finke-Anlauff et al. |
| 7,400,917 | B2 | 7/2008 | Wood et al. |
| D574,326 | S | 8/2008 | Lim |
| D574,819 | S | 8/2008 | Andre et al. |
| D575,056 | S | 8/2008 | Tan |
| 7,428,427 | B2 | 9/2008 | Brunstrom et al. |
| D577,904 | S | 10/2008 | Sasaki |
| D581,151 | S | 11/2008 | Aipa |
| D581,155 | S | 11/2008 | Richardson et al. |
| D581,421 | S | 11/2008 | Richardson et al. |
| D582,149 | S | 12/2008 | Tan |
| 7,464,814 | B2 | 12/2008 | Carnevali |
| D584,732 | S | 1/2009 | Cho et al. |
| 7,479,759 | B2 | 1/2009 | Vilanov et al. |
| D587,008 | S | 2/2009 | Richardson et al. |
| D587,896 | S | 3/2009 | Aipa |
| D589,016 | S | 3/2009 | Richardson et al. |
| D589,953 | S | 4/2009 | Turner |
| 7,521,935 | B2 | 4/2009 | Uchida |
| 7,536,099 | B2 | 5/2009 | Dalby et al. |
| D593,319 | S | 6/2009 | Richardson et al. |
| D593,746 | S | 6/2009 | Richardson et al. |
| D594,849 | S | 6/2009 | Ko |
| 7,541,780 | B2 | 6/2009 | Nagasawa |
| 7,554,289 | B2 | 6/2009 | Idzik et al. |
| 7,555,325 | B2 | 6/2009 | Goros |
| D597,089 | S | 7/2009 | Khan et al. |
| 7,562,813 | B2 | 7/2009 | Humphrey et al. |
| D597,301 | S | 8/2009 | Richardson et al. |
| D598,407 | S | 8/2009 | Richardson et al. |
| 7,577,462 | B2 | 8/2009 | Kumar |
| D600,640 | S | 9/2009 | Stein et al. |
| D600,908 | S | 9/2009 | Richardson et al. |
| D601,955 | S | 10/2009 | Ekmekdje |
| D601,959 | S | 10/2009 | Lee et al. |
| D601,960 | S | 10/2009 | Dai |
| 7,609,512 | B2 | 10/2009 | Richardson et al. |
| D603,602 | S | 11/2009 | Richardson et al. |
| D603,603 | S | 11/2009 | Laine et al. |
| 7,612,997 | B1 | 11/2009 | Diebel et al. |
| D605,850 | S | 12/2009 | Richardson et al. |
| D606,528 | S | 12/2009 | Khan et al. |
| D606,529 | S | 12/2009 | Ferrari et al. |
| 7,635,086 | B2 | 12/2009 | Spencer, II |
| 7,638,969 | B2 | 12/2009 | Woud |
| 7,647,082 | B2 | 1/2010 | Holmberg |
| D609,228 | S | 2/2010 | Ferrari et al. |
| D609,463 | S | 2/2010 | Bullen |
| D610,538 | S | 2/2010 | Wu et al. |
| 7,656,120 | B2 | 2/2010 | Neu et al. |
| 7,663,878 | B2 | 2/2010 | Swan et al. |
| 7,667,433 | B1 | 2/2010 | Smith |
| D610,807 | S | 3/2010 | Bau |
| D611,042 | S | 3/2010 | Ferrari et al. |
| D611,478 | S | 3/2010 | Richardson et al. |
| 7,669,829 | B2 | 3/2010 | Ogatsu |
| D613,282 | S | 4/2010 | Richardson et al. |
| D615,077 | S | 5/2010 | Richardson et al. |
| D615,535 | S | 5/2010 | Richardson et al. |
| D615,536 | S | 5/2010 | Richardson et al. |
| D615,967 | S | 5/2010 | Richardson et al. |
| D616,360 | S | 5/2010 | Huang |
| D616,361 | S | 5/2010 | Huang |
| D617,753 | S | 6/2010 | Cheng |
| D617,784 | S | 6/2010 | Richardson et al. |
| D617,785 | S | 6/2010 | Richardson et al. |
| D617,786 | S | 6/2010 | Richardson et al. |
| D617,787 | S | 6/2010 | Richardson et al. |
| D618,231 | S | 6/2010 | Fahrendorff et al. |
| 7,733,637 | B1 | 6/2010 | Lam |
| D619,573 | S | 7/2010 | Khan et al. |
| D619,574 | S | 7/2010 | Richardson et al. |
| D619,991 | S | 7/2010 | Huang |
| D620,000 | S | 7/2010 | Bau |
| D620,487 | S | 7/2010 | Richardson et al. |
| D621,394 | S | 8/2010 | Richardson et al. |
| D621,395 | S | 8/2010 | Richardson et al. |
| D621,821 | S | 8/2010 | Richardson et al. |
| D621,822 | S | 8/2010 | Richardson et al. |
| 7,778,023 | B1 | 8/2010 | Mohoney |
| 7,782,610 | B2 | 8/2010 | Diebel et al. |
| D623,179 | S | 9/2010 | Richardson et al. |
| D623,180 | S | 9/2010 | Diebel |
| D623,638 | S | 9/2010 | Richardson et al. |
| D623,639 | S | 9/2010 | Richardson et al. |
| D623,640 | S | 9/2010 | Freeman |
| D624,317 | S | 9/2010 | Wenchel et al. |
| D624,533 | S | 9/2010 | Richardson et al. |
| D624,908 | S | 10/2010 | Huskinson |
| D624,909 | S | 10/2010 | Huskinson |
| D624,910 | S | 10/2010 | Richardson et al. |
| D625,303 | S | 10/2010 | Kim |
| D626,120 | S | 10/2010 | Richardson et al. |
| D626,121 | S | 10/2010 | Richardson et al. |
| D626,538 | S | 11/2010 | Brown et al. |
| D626,539 | S | 11/2010 | Brown et al. |
| D626,540 | S | 11/2010 | Brown et al. |
| D626,964 | S | 11/2010 | Richardson et al. |
| D628,568 | S | 12/2010 | Richardson et al. |
| D628,994 | S | 12/2010 | Griffin, Jr. et al. |
| 7,859,222 | B2 | 12/2010 | Woud |
| D631,246 | S | 1/2011 | Boettner |
| 7,863,856 | B2 | 1/2011 | Sherman et al. |
| 7,863,862 | B2 | 1/2011 | Idzik et al. |
| 7,872,448 | B2 | 1/2011 | Taniguchi et al. |
| D631,877 | S | 2/2011 | Rak et al. |
| D632,648 | S | 2/2011 | Yang |
| D632,683 | S | 2/2011 | Richardson et al. |
| D632,684 | S | 2/2011 | Richardson et al. |
| D632,685 | S | 2/2011 | Richardson et al. |
| D632,686 | S | 2/2011 | Magness et al. |
| 7,889,489 | B2 | 2/2011 | Richardson et al. |
| 7,889,498 | B2 | 2/2011 | Diebel et al. |
| D634,704 | S | 3/2011 | Tieleman et al. |
| D634,741 | S | 3/2011 | Richardson et al. |
| 7,899,397 | B2 | 3/2011 | Kumar |
| 7,907,394 | B2 | 3/2011 | Richardson et al. |
| 7,911,530 | B2 | 3/2011 | Sawachi |
| D636,386 | S | 4/2011 | Richardson et al. |
| D636,387 | S | 4/2011 | Willes et al. |
| 7,930,011 | B2 | 4/2011 | Shi et al. |
| 7,933,122 | B2 | 4/2011 | Richardson et al. |
| D637,588 | S | 5/2011 | Richardson et al. |
| D637,589 | S | 5/2011 | Willes et al. |
| D637,590 | S | 5/2011 | Michie et al. |
| D637,591 | S | 5/2011 | Willes et al. |
| D637,592 | S | 5/2011 | Magness et al. |
| D637,952 | S | 5/2011 | Tan |
| D638,005 | S | 5/2011 | Richardson et al. |
| D638,411 | S | 5/2011 | Willes et al. |
| D638,413 | S | 5/2011 | Magness et al. |
| D638,414 | S | 5/2011 | Magness et al. |
| D638,828 | S | 5/2011 | Melanson et al. |
| D638,829 | S | 5/2011 | Melanson et al. |
| D638,830 | S | 5/2011 | Magness et al. |
| D639,731 | S | 6/2011 | Sun |
| D640,679 | S | 6/2011 | Willes et al. |
| D640,680 | S | 6/2011 | Magness et al. |
| 7,957,524 | B2 | 6/2011 | Chipping |
| D641,013 | S | 7/2011 | Richardson et al. |
| D641,014 | S | 7/2011 | Smith et al. |
| D641,974 | S | 7/2011 | Stampfli |
| D642,169 | S | 7/2011 | Andre et al. |
| D642,170 | S | 7/2011 | Johnson et al. |
| D642,171 | S | 7/2011 | Melanson et al. |
| 7,983,862 | B2 | 7/2011 | Zhang |
| D642,558 | S | 8/2011 | Magness |
| D643,029 | S | 8/2011 | Feng |
| D643,424 | S | 8/2011 | Richardson et al. |
| D644,215 | S | 8/2011 | Dong |
| D644,216 | S | 8/2011 | Richardson et al. |
| D644,219 | S | 8/2011 | Sawada |
| 7,988,010 | B2 | 8/2011 | Yang et al. |
| 8,004,962 | B2 | 8/2011 | Yang et al. |

(56) References Cited

U.S. PATENT DOCUMENTS

D644,635 S 9/2011 Richardson et al.
D644,639 S 9/2011 Weller et al.
D647,084 S 10/2011 Fathollahi
D647,108 S 10/2011 Lee
8,028,794 B1 10/2011 Freeman
8,046,039 B2 10/2011 Lee et al.
D648,714 S 11/2011 Jones, III et al.
D648,715 S 11/2011 Jones, III et al.
D648,716 S 11/2011 Jones, III et al.
D648,717 S 11/2011 Fahrendorff et al.
D649,143 S 11/2011 Jones, III et al.
D649,539 S 11/2011 Hong
8,063,606 B2 11/2011 Veselic
D650,810 S 12/2011 Lemelman et al.
8,073,131 B2 12/2011 Bodkin et al.
8,084,987 B2 12/2011 Hurtz
D652,827 S 1/2012 Fahrendorff et al.
D652,828 S 1/2012 Fahrendorff et al.
D653,202 S 1/2012 Hasbrook et al.
D653,659 S 2/2012 Fahrendorff et al.
D654,069 S 2/2012 Kwon
D654,483 S 2/2012 Richardson et al.
D654,931 S 2/2012 Lemelman et al.
D655,281 S 3/2012 Turocy
D655,699 S 3/2012 Bau
D656,134 S 3/2012 Melville et al.
D656,135 S 3/2012 Swartz et al.
D656,495 S 3/2012 Andre et al.
D658,165 S 4/2012 Freeman
8,150,485 B2 4/2012 Lee
D658,643 S 5/2012 Fahrendorff et al.
8,167,127 B2 5/2012 Martin et al.
D662,923 S 7/2012 Piedra et al.
D662,924 S 7/2012 Melanson et al.
D663,263 S 7/2012 Gupta et al.
D663,319 S 7/2012 Chen et al.
D663,724 S 7/2012 Lee
D664,091 S 7/2012 Pliner et al.
8,224,408 B2 7/2012 Tomasini et al.
D665,386 S 8/2012 Fathollahi
D665,735 S 8/2012 Kang et al.
8,245,842 B2 8/2012 Bau
8,247,102 B2 8/2012 Hua
8,255,176 B2 8/2012 Plestid
D667,783 S 9/2012 Zhang et al.
D670,281 S 11/2012 Corpuz et al.
D670,689 S 11/2012 Wang
D671,105 S 11/2012 Rothbaum et al.
D671,106 S 11/2012 Rothbaum et al.
D671,493 S 11/2012 Hasbrook et al.
8,321,619 B2 11/2012 Kular et al.
D671,930 S 12/2012 Akana et al.
8,328,008 B2 12/2012 Diebel et al.
D673,937 S 1/2013 Cheng et al.
D674,394 S 1/2013 Kajimoto
D674,789 S 1/2013 Wen
8,342,325 B2 1/2013 Rayner
8,355,515 B2 1/2013 Mao et al.
D675,603 S 2/2013 Melanson et al.
D676,032 S 2/2013 Stump et al.
D676,432 S 2/2013 Hasbrook et al.
8,367,235 B2 2/2013 Huang et al.
8,380,264 B2 2/2013 Hung et al.
D677,249 S 3/2013 Li et al.
D677,251 S 3/2013 Melanson et al.
D678,262 S 3/2013 Prato
D678,869 S 3/2013 Diebel
8,390,255 B1 3/2013 Fathollahi
8,393,466 B2 3/2013 Rayner
D679,271 S 4/2013 Liu
D679,684 S 4/2013 Baker et al.
D679,695 S 4/2013 Fahrendorff et al.
D679,699 S 4/2013 Piedra et al.
D681,020 S 4/2013 Magness et al.
D682,196 S 5/2013 Leung
D682,815 S 5/2013 Chang
D683,338 S 5/2013 Wilson et al.
8,439,191 B1 5/2013 Lu
8,452,242 B2 5/2013 Spencer, II
D684,554 S 6/2013 Park
8,457,701 B2 6/2013 Diebel
D685,356 S 7/2013 Diebel
D685,737 S 7/2013 de Jong et al.
D686,152 S 7/2013 Lee et al.
D686,586 S 7/2013 Cho
D686,606 S 7/2013 Hong
8,483,758 B2 7/2013 Huang
D687,426 S 8/2013 Requa
D688,233 S 8/2013 Dong
8,499,933 B2 8/2013 Ziemba
8,505,718 B2 8/2013 Griffin, Jr. et al.
8,509,864 B1 8/2013 Diebel
8,509,865 B1 8/2013 LaColla et al.
8,523,124 B2 9/2013 Yuan et al.
8,531,833 B2 9/2013 Diebel et al.
D691,990 S 10/2013 Rayner
8,560,014 B1 10/2013 Hu et al.
D693,801 S 11/2013 Rayner
8,579,172 B2 11/2013 Monaco et al.
8,583,955 B2 11/2013 Lu et al.
D696,234 S 12/2013 Wright
D696,238 S 12/2013 Murchison et al.
D696,240 S 12/2013 Kim et al.
D697,502 S 1/2014 Chu et al.
D697,504 S 1/2014 Yang
D697,902 S 1/2014 Fathollahi
D698,774 S 2/2014 Wardy
D698,775 S 2/2014 Huang
D703,649 S 4/2014 Wikel et al.
D703,652 S 4/2014 Melanson et al.
D704,182 S 5/2014 Smith
D704,688 S 5/2014 Reivo et al.
D705,768 S 5/2014 Melanson et al.
D706,253 S 6/2014 Simmer
D706,255 S 6/2014 Akana et al.
D706,256 S 6/2014 Ward et al.
D706,272 S 6/2014 Poon
D709,058 S 7/2014 Hemesath et al.
D709,439 S 7/2014 Ferber et al.
D709,485 S 7/2014 Bishop
8,788,852 B2 7/2014 Chun et al.
D710,344 S 8/2014 Smith et al.
D710,347 S 8/2014 Esses
D710,795 S 8/2014 Gupta et al.
D710,839 S 8/2014 Chang
D711,312 S 8/2014 Tien
D711,362 S 8/2014 Poon
D711,863 S 8/2014 Wen
D714,274 S 9/2014 Jung
D714,278 S 9/2014 Case et al.
D714,295 S 9/2014 Fujioka
8,837,156 B2 9/2014 Sun et al.
8,841,798 B2 9/2014 Tuukkanen et al.
D716,312 S 10/2014 Fujioka
D716,784 S 11/2014 Wen
D716,785 S 11/2014 White
D717,781 S 11/2014 Kim
D718,230 S 11/2014 To et al.
D718,289 S 11/2014 Brand
D718,291 S 11/2014 Hong
D718,293 S 11/2014 Namminga et al.
D718,754 S 12/2014 To et al.
D718,755 S 12/2014 To et al.
D718,757 S 12/2014 Jaffee
D718,758 S 12/2014 Jaffee
D719,947 S 12/2014 Kobayashi
D720,341 S 12/2014 Sharudenko
8,917,506 B2 12/2014 Diebel et al.
D720,738 S 1/2015 Rodriguez et al.
D720,740 S 1/2015 Wicks et al.
D721,356 S 1/2015 Hasbrook et al.
D721,357 S 1/2015 Johnson
D721,685 S 1/2015 Hasbrook et al.
D721,687 S 1/2015 To et al.

(56) References Cited

U.S. PATENT DOCUMENTS

| | | | |
|---|---|---|---|
| 8,933,659 B2 | 1/2015 | Sakai | |
| D722,043 S | 2/2015 | Requa | |
| D722,312 S | 2/2015 | Tages et al. | |
| D723,018 S | 2/2015 | White | |
| 8,954,117 B2 | 2/2015 | Huang | |
| 8,955,678 B2 | 2/2015 | Murphy et al. | |
| D723,530 S | 3/2015 | Namminga et al. | |
| D724,065 S | 3/2015 | Fathollahi | |
| D724,574 S | 3/2015 | Williams | |
| D725,091 S | 3/2015 | Wen | |
| 8,971,039 B2 | 3/2015 | Huang et al. | |
| D727,883 S | 4/2015 | Brand et al. | |
| D728,468 S | 5/2015 | Ferber et al. | |
| 9,026,187 B2 * | 5/2015 | Huang ................. | H05K 5/0086 455/575.8 |
| D732,012 S | 6/2015 | Tsai et al. | |
| 9,073,437 B2 | 7/2015 | Matsumoto et al. | |
| 9,077,013 B2 | 7/2015 | Huang et al. | |
| 9,088,028 B2 | 7/2015 | Huang et al. | |
| 9,088,029 B2 | 7/2015 | Huang et al. | |
| D738,365 S | 9/2015 | Melanson et al. | |
| D739,394 S | 9/2015 | Rayner et al. | |
| 9,123,935 B2 | 9/2015 | Huang | |
| 9,142,985 B2 | 9/2015 | Arai et al. | |
| D740,797 S | 10/2015 | Daniel | |
| D741,844 S | 10/2015 | Rayner et al. | |
| 9,153,985 B1 | 10/2015 | Gjøvik et al. | |
| 9,172,070 B2 | 10/2015 | Huang et al. | |
| D744,472 S | 12/2015 | Lerenthal | |
| D744,989 S | 12/2015 | Lee | |
| D744,993 S | 12/2015 | Diebel | |
| D744,995 S | 12/2015 | Lerenthal | |
| D746,273 S | 12/2015 | Herbst | |
| D746,275 S | 12/2015 | Mohammad | |
| D746,801 S | 1/2016 | Pan | |
| D748,612 S | 2/2016 | Chan et al. | |
| D749,557 S | 2/2016 | Feng | |
| D751,058 S | 3/2016 | Cocchia et al. | |
| D751,059 S | 3/2016 | Cocchia et al. | |
| D751,542 S | 3/2016 | Daniel | |
| 9,276,421 B2 | 3/2016 | Weissinger, Jr. et al. | |
| 9,313,305 B1 | 4/2016 | Diebel | |
| 9,319,501 B2 | 4/2016 | Huang | |
| D756,909 S | 5/2016 | Gupta et al. | |
| D756,910 S | 5/2016 | Gupta et al. | |
| 9,356,267 B1 | 5/2016 | To et al. | |
| D759,641 S | 6/2016 | Lai et al. | |
| 9,402,452 B2 | 8/2016 | Diebel et al. | |
| 9,406,913 B2 | 8/2016 | Huang et al. | |
| D765,628 S | 9/2016 | Watt et al. | |
| D765,636 S | 9/2016 | Kanazawa | |
| D766,819 S | 9/2016 | Gjøvik et al. | |
| D767,485 S | 9/2016 | To et al. | |
| D768,612 S | 10/2016 | Wright et al. | |
| 9,477,288 B2 | 10/2016 | Yang | |
| D772,855 S | 11/2016 | Ju | |
| 9,495,375 B2 | 11/2016 | Huang et al. | |
| 9,545,140 B1 | 1/2017 | Johnson et al. | |
| 9,576,178 B2 | 2/2017 | Pope et al. | |
| 9,577,695 B2 | 2/2017 | Huang | |
| 9,583,792 B2 | 2/2017 | Bulur et al. | |
| D781,839 S | 3/2017 | Kim et al. | |
| 9,735,595 B2 | 8/2017 | Colahan et al. | |
| 9,748,535 B2 | 8/2017 | Huang et al. | |
| D797,091 S | 9/2017 | To et al. | |
| D797,092 S | 9/2017 | To et al. | |
| D797,093 S | 9/2017 | To et al. | |
| 9,751,423 B2 | 9/2017 | Niioka et al. | |
| 9,755,444 B2 | 9/2017 | To et al. | |
| 9,793,750 B2 | 10/2017 | Miller et al. | |
| 9,876,522 B2 | 1/2018 | Huang et al. | |
| 2001/0054148 A1 | 12/2001 | Hoornaert et al. | |
| 2002/0065054 A1 | 5/2002 | Humphreys et al. | |
| 2002/0111189 A1 | 8/2002 | Chou | |
| 2002/0147035 A1 | 10/2002 | Su | |
| 2002/0193136 A1 | 12/2002 | Halkosaari et al. | |
| 2002/0197965 A1 | 12/2002 | Peng | |
| 2003/0000984 A1 | 1/2003 | Vick, III | |
| 2003/0006998 A1 | 1/2003 | Kumar | |
| 2003/0096642 A1 | 5/2003 | Bessa et al. | |
| 2003/0151890 A1 | 8/2003 | Huang et al. | |
| 2003/0217210 A1 | 11/2003 | Carau, Sr. | |
| 2003/0218445 A1 | 11/2003 | Behar | |
| 2003/0228866 A1 | 12/2003 | Pezeshki | |
| 2004/0096054 A1 | 5/2004 | Nuovo | |
| 2004/0097256 A1 | 5/2004 | Kujawski | |
| 2004/0104268 A1 | 6/2004 | Bailey | |
| 2004/0247113 A1 | 12/2004 | Akatsu | |
| 2004/0268005 A1 | 12/2004 | Dickie | |
| 2005/0049016 A1 | 3/2005 | Cho et al. | |
| 2005/0088141 A1 | 4/2005 | Lee et al. | |
| 2005/0090301 A1 | 4/2005 | Lange et al. | |
| 2005/0093510 A1 | 5/2005 | Seil et al. | |
| 2005/0116684 A1 | 6/2005 | Kim | |
| 2005/0130721 A1 | 6/2005 | Gartrell | |
| 2005/0228281 A1 | 10/2005 | Nefos | |
| 2005/0231159 A1 | 10/2005 | Jones et al. | |
| 2005/0247787 A1 | 11/2005 | Von Mueller et al. | |
| 2005/0248312 A1 | 11/2005 | Cao et al. | |
| 2005/0286212 A1 | 12/2005 | Brignone et al. | |
| 2006/0003709 A1 | 1/2006 | Wood | |
| 2006/0010588 A1 | 1/2006 | Schuster et al. | |
| 2006/0052064 A1 | 3/2006 | Goradesky | |
| 2006/0058073 A1 | 3/2006 | Kim | |
| 2006/0063569 A1 | 3/2006 | Jacobs et al. | |
| 2006/0099999 A1 | 5/2006 | Park | |
| 2006/0105722 A1 | 5/2006 | Kumar | |
| 2006/0105824 A1 | 5/2006 | Kim et al. | |
| 2006/0125445 A1 | 6/2006 | Cao et al. | |
| 2006/0140461 A1 | 6/2006 | Kim | |
| 2006/0166043 A1 | 7/2006 | Eom et al. | |
| 2006/0197674 A1 | 9/2006 | Nakajima | |
| 2006/0205381 A1 | 9/2006 | Beart et al. | |
| 2006/0205447 A1 | 9/2006 | Park et al. | |
| 2006/0208694 A1 | 9/2006 | Fee | |
| 2006/0250108 A1 | 11/2006 | Pettigrew et al. | |
| 2006/0255493 A1 | 11/2006 | Fouladpour | |
| 2007/0004450 A1 | 1/2007 | Parikh | |
| 2007/0019804 A1 | 1/2007 | Kramer | |
| 2007/0093140 A1 | 4/2007 | Begic et al. | |
| 2007/0123316 A1 | 5/2007 | Little | |
| 2007/0142097 A1 | 6/2007 | Hamasaki et al. | |
| 2007/0152633 A1 | 7/2007 | Lee | |
| 2007/0161404 A1 | 7/2007 | Yasujima et al. | |
| 2007/0167190 A1 | 7/2007 | Moosavi et al. | |
| 2007/0184879 A1 | 8/2007 | Nakai | |
| 2007/0187563 A1 | 8/2007 | Ogatsu | |
| 2007/0223182 A1 | 9/2007 | Swan et al. | |
| 2007/0225031 A1 | 9/2007 | Bodkin et al. | |
| 2007/0236180 A1 | 10/2007 | Rodgers | |
| 2007/0261978 A1 | 11/2007 | Sanderson | |
| 2007/0297149 A1 | 12/2007 | Richardson et al. | |
| 2008/0007214 A1 | 1/2008 | Cheng | |
| 2008/0026794 A1 | 1/2008 | Warren | |
| 2008/0026803 A1 | 1/2008 | Demuynck | |
| 2008/0032758 A1 | 2/2008 | Rostami | |
| 2008/0053770 A1 | 3/2008 | Tynyk | |
| 2008/0058010 A1 | 3/2008 | Lee | |
| 2008/0096620 A1 | 4/2008 | Lee et al. | |
| 2008/0108395 A1 | 5/2008 | Lee et al. | |
| 2008/0119244 A1 | 5/2008 | Malhotra | |
| 2008/0123287 A1 | 5/2008 | Rossell et al. | |
| 2008/0132289 A1 | 6/2008 | Wood et al. | |
| 2008/0139258 A1 | 6/2008 | Park et al. | |
| 2008/0150367 A1 | 6/2008 | Oh et al. | |
| 2008/0238356 A1 | 10/2008 | Batson et al. | |
| 2008/0316687 A1 | 12/2008 | Richardson et al. | |
| 2009/0009945 A1 | 1/2009 | Johnson et al. | |
| 2009/0017883 A1 | 1/2009 | Lin | |
| 2009/0051319 A1 | 2/2009 | Fang et al. | |
| 2009/0069050 A1 | 3/2009 | Jain et al. | |
| 2009/0073650 A1 | 3/2009 | Huang et al. | |
| 2009/0096417 A1 | 4/2009 | Idzik et al. | |
| 2009/0108800 A1 | 4/2009 | Woud | |

(56) References Cited

U.S. PATENT DOCUMENTS

2009/0111543 A1 4/2009 Tai et al.
2009/0114556 A1 5/2009 Tai et al.
2009/0117955 A1 5/2009 Lo
2009/0128092 A1 5/2009 Woud
2009/0143104 A1 6/2009 Loh et al.
2009/0144456 A1 6/2009 Gelf et al.
2009/0146898 A1 6/2009 Akiho et al.
2009/0152089 A1 6/2009 Hanes
2009/0160399 A1 6/2009 Woud
2009/0160400 A1 6/2009 Woud
2009/0181729 A1 7/2009 Griffin, Jr. et al.
2009/0205983 A1 8/2009 Estlander
2009/0247244 A1 10/2009 Mittleman et al.
2009/0284216 A1 11/2009 Bessa et al.
2009/0301289 A1 12/2009 Gynes
2009/0312058 A9 12/2009 Wood et al.
2009/0314400 A1 12/2009 Liu
2009/0325657 A1 12/2009 Ramsdell et al.
2010/0001684 A1 1/2010 Eastlack
2010/0005225 A1 1/2010 Honda et al.
2010/0013431 A1 1/2010 Liu
2010/0022277 A1 1/2010 An et al.
2010/0026589 A1 2/2010 Dou et al.
2010/0048267 A1 2/2010 Lin
2010/0056054 A1 3/2010 Yamato et al.
2010/0064883 A1 3/2010 Gynes
2010/0066311 A1 3/2010 Bao et al.
2010/0078343 A1 4/2010 Hoellwarth et al.
2010/0088439 A1 4/2010 Ang et al.
2010/0093412 A1 4/2010 Serra et al.
2010/0096284 A1 4/2010 Bau
2010/0113106 A1 5/2010 Supran
2010/0121588 A1 5/2010 Elder et al.
2010/0132724 A1 6/2010 Seidel et al.
2010/0154062 A1 6/2010 Baram et al.
2010/0195279 A1 8/2010 Michael
2010/0200456 A1 8/2010 Parkinson
2010/0203931 A1 8/2010 Hynecek et al.
2010/0224519 A1 9/2010 Kao
2010/0243516 A1 9/2010 Martin et al.
2010/0300909 A1 12/2010 Hung
2010/0302716 A1 12/2010 Gandhi
2010/0315041 A1 12/2010 Tan
2010/0328203 A1 12/2010 Hsu
2011/0021255 A1 1/2011 Kim et al.
2011/0034221 A1 2/2011 Hung et al.
2011/0049005 A1 3/2011 Wilson et al.
2011/0050164 A1 3/2011 Partovi et al.
2011/0055447 A1 3/2011 Costa
2011/0084081 A1 4/2011 Chung et al.
2011/0090626 A1 4/2011 Hoellwarth et al.
2011/0117974 A1 5/2011 Spitalnik et al.
2011/0136555 A1 6/2011 Ramies et al.
2011/0175569 A1 7/2011 Austin
2011/0199041 A1 8/2011 Yang
2011/0244930 A1 10/2011 Kong et al.
2011/0253569 A1 10/2011 Lord
2011/0259664 A1 10/2011 Freeman
2011/0261511 A1 10/2011 Alderson et al.
2011/0297578 A1 12/2011 Stiehl et al.
2011/0309728 A1 12/2011 Diebel
2012/0013295 A1 1/2012 Yeh
2012/0031788 A1 2/2012 Mongan et al.
2012/0071214 A1 3/2012 Ash, Jr. et al.
2012/0088555 A1 4/2012 Hu
2012/0088558 A1 4/2012 Song
2012/0106037 A1 5/2012 Diebel et al.
2012/0115551 A1 5/2012 Cho et al.
2012/0119695 A1 5/2012 Pin
2012/0122520 A1 5/2012 Phillips
2012/0161696 A1 6/2012 Cook et al.
2012/0177967 A1 7/2012 Wang
2012/0209745 A1 8/2012 Spencer, II
2012/0282977 A1 11/2012 Haleluk
2012/0286741 A1 11/2012 Seethaler et al.
2012/0302294 A1 11/2012 Hammond et al.
2012/0305422 A1 12/2012 Vandiver
2012/0320501 A1 12/2012 Ackloo
2012/0325637 A1 12/2012 Kikuchi
2013/0007336 A1 1/2013 Chun et al.
2013/0020998 A1 1/2013 Howard
2013/0023313 A1 1/2013 Kim
2013/0045775 A1 2/2013 Heywood
2013/0052871 A1 2/2013 Eklind
2013/0082662 A1 4/2013 Carre et al.
2013/0084799 A1 4/2013 Marholev et al.
2013/0088815 A1 4/2013 Hu et al.
2013/0098790 A1 4/2013 Hong
2013/0125251 A1 5/2013 Johnson
2013/0146491 A1 6/2013 Ghali et al.
2013/0166928 A1 6/2013 Yang
2013/0189923 A1 7/2013 Lewin
2013/0210475 A1 8/2013 Nylund
2013/0248339 A1 9/2013 Koepsell
2013/0273983 A1 10/2013 Hsu
2013/0305528 A1 11/2013 Anderson
2013/0307818 A1 11/2013 Pope et al.
2013/0314030 A1 11/2013 Fathollahi
2013/0318282 A1 11/2013 Wakutsu et al.
2014/0035511 A1 2/2014 Ferber et al.
2014/0065948 A1 3/2014 Huang
2014/0069825 A1 3/2014 Macrina et al.
2014/0091765 A1 4/2014 Law
2014/0132205 A1 5/2014 Paczkowski et al.
2014/0141838 A1 5/2014 Cai et al.
2014/0152257 A1 6/2014 Miller et al.
2014/0165379 A1 6/2014 Diebel et al.
2014/0191033 A1 7/2014 Wojcik et al.
2014/0239916 A1 8/2014 To et al.
2014/0268518 A1 9/2014 Huang et al.
2014/0375182 A1 12/2014 Li et al.
2014/0375186 A1 12/2014 Tarnow et al.
2015/0028797 A1 1/2015 Miller et al.
2015/0141090 A1 5/2015 Hwan et al.
2015/0189053 A1 7/2015 LaHam
2015/0194648 A1 7/2015 Fathollahi et al.
2015/0194833 A1 7/2015 Fathollahi et al.
2015/0214993 A1 7/2015 Huang
2015/0215439 A1 7/2015 Stanimirovic et al.
2015/0256008 A1 9/2015 Miller et al.
2015/0281410 A1 10/2015 Takahashi
2015/0289615 A1 10/2015 Welsch
2015/0303722 A1 10/2015 Li
2015/0364875 A1 12/2015 Ginsberg
2015/0381226 A1 12/2015 Mogol
2016/0004896 A1 1/2016 Pope et al.
2016/0064962 A1 3/2016 Huang et al.
2016/0064963 A1 3/2016 Huang et al.
2016/0064979 A1 3/2016 Huang et al.
2016/0093122 A1 3/2016 Chen
2016/0112085 A1 4/2016 Johnson
2016/0181580 A1 6/2016 To et al.
2016/0254698 A1 9/2016 Anderson
2016/0267313 A1 9/2016 Pope et al.
2016/0329607 A1 11/2016 Miyao
2018/0019613 A1 1/2018 Miller et al.

FOREIGN PATENT DOCUMENTS

CN 201054376 4/2008
CN 201114197 9/2008
CN 201146541 11/2008
CN 201252577 Y 6/2009
CN 201447167 5/2010
CN 201573829 9/2010
CN 202364273 U 8/2012
CN 202535667 U 11/2012
CN 302510329 S 7/2013
CN 302573150 S 9/2013
DE 10 2007 021 988 11/2008
EP 1732291 A1 12/2006
JP 62-014133 1/1987
JP 8-18637 1/1996
JP 2000-175720 6/2000

(56) References Cited

FOREIGN PATENT DOCUMENTS

| | | | |
|---|---|---|---|
| JP | 2005-093277 | | 4/2005 |
| JP | 2005-234353 | | 9/2005 |
| JP | 2005-0236933 | | 9/2005 |
| JP | 2007-116369 | | 5/2007 |
| KR | 10-2008-0017688 | | 2/2008 |
| KR | 20-2010-0005030 | | 5/2010 |
| KR | 10-2010-0132724 | | 12/2010 |
| KR | 10-2011-0005507 | | 1/2011 |
| KR | 10-2011-0062089 | | 6/2011 |
| KR | 30-0650361 | | 7/2012 |
| KR | 10-2005-0027961 | | 3/2015 |
| TW | D150044 | | 11/2012 |
| TW | D156538 | | 10/2013 |
| WO | WO 95/15619 | | 6/1995 |
| WO | WO 97/33497 | | 9/1997 |
| WO | WO 00/13330 | | 3/2000 |
| WO | WO 03/065227 | A1 | 8/2003 |
| WO | WO 2004/017613 | | 2/2004 |
| WO | WO 2007/079494 | | 7/2007 |
| WO | WO 08/151362 | A2 | 12/2008 |

OTHER PUBLICATIONS

U.S. Appl. No. 15/130,196 including its prosecution history, filed Apr. 15, 2016, Huang.
U.S. Appl. No. 29/382,515 Including its prosecution history, filed Jan. 4, 2011, Gallouzi et al.
U.S. Appl. No. 29/464,620 Including its prosecution history, filed Aug. 19, 2013, Tsai.
U.S. Appl. No. 29/478,391 Including its prosecution history, filed Jan. 3, 2014, Namminga et al.
U.S. Appl. No. 29/478,390 Including its prosecution history, filed Jan. 3, 2014, Dang et al.
U.S. Appl. No. 29/478,383 Including its prosecution history, filed Jan. 3, 2014, Dang et al.
U.S. Appl. No. 29/478,388 Including its prosecution history, filed Jan. 3, 2014, Kim et al.
U.S. Appl. No. 29/499,868 Including its prosecution history, filed Aug. 19, 2014, Mohpie, Inc.
U.S. Appl. No. 29/539,419 Including its prosecution history, filed Sep. 14, 2015, Dang et al.
U.S. Appl. No. 29/523,209 Including its prosectuion history, filed Apr. 7, 2015, Mophie, Inc.
U.S. Appl. No. 29/528,266 Including its prosecution history, filed May 27, 2015, Date Gjøyik et al.
U.S. Appl. No. 29/534,901 Including its prosecution history, filed Jul. 31, 2015, Dang et al.
U.S. Appl. No. 15/223,683 Including its prosecution history, filed Jul. 29, 2016, Huang et al.
U.S. Appl. No. 15/223,735 Including its prosecution history, filed Jul. 29, 2016, Diebel et al.
U.S. Appl. No. 29/556,805 Including its prosecution history, filed Mar. 3, 2016, Dang et al.
U.S. Appl. No. 29/556,807 Including its prosecution history, filed Mar. 3, 2016, Dang et al.
U.S. Appl. No. 29/556,809 Including its prosecution history, filed Mar. 3, 2016, Dang et al.
U.S. Appl. No. 15/686,700 Including its prosecution history, filed Aug. 25, 2017, Huang et al.
U.S. Appl. No. 29/626,999 Including its prosecution history, filed Nov. 21, 2017.
International Search Report and Written Opinion of the International Searching Authority for PCT/US2011/037244, dated Jul. 19, 2011.
International Preliminary Report on Patentability for PCT/US2011/037244, dated Nov. 29, 2012.
International Search Report and Written Opinion of the International Searching Authority for PCT/US2011/037249, dated Jul. 13, 2011.
International Preliminary Report on Patentability for PCT/US2011/037249, dated Nov. 29, 2012.
International Search Report and Written Opinion of the International Searching Authority for PCT/US2011/037254, dated Jul. 13, 2011.
International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Preliminary Report on Patentability for PCT/US2013/057276, dated Mar. 3, 2015.
International Search Report and Written Opinion of the International Searching Authority for PCT/US2014/017781, dated Jun. 8, 2014.
International Preliminary Report on Patentability for PCT/US2014/017781, dated Aug. 25, 2015.
International Search Report and Written Opinion of the International Searching Authority for PCT/US2014/023592, dated Aug. 28, 2014.
International Preliminary Report on Patentability for PCT/US2014/023592, dated Sep. 15, 2015.
International Search Report and Written Opinion for PCT/US2014/067470, dated Mar. 31, 2015.
International Preliminary Report of Patentability for PCT/US2014/067470, dated Jun. 9, 2016.
International Search Report and Written Opinion for PCT/US2015/065800, dated Apr. 21, 2016.
International Preliminary Report on Patentability for PCT/US2015/065800, dated Jun. 29, 2017.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone-5-5s/.
Jeremy Horwitz, "Mophie Juice Pack Plus for iPhone 5," dated May 21, 2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Jeremy Horwitz, "Kensington Mini Battery Pack and Charger for iPhone and iPod," dated May 16, 2008, http://www.ilounge.com/index.php/reviews/entry/kensington-mini-battery-pack-and-charger-for-iphone-and-ipod/.
Kensington Mini Battery Pack and Charger for iPhone and iPod, dated Sep. 30, 2008, 1 Page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the-gadgeteer.com/2008/06/16/richard_solo_backup_battery_for_iphone_ipod/.
Devin Coldewey, "Combination iPhone battery pack and flash from FastMac," dated Nov. 4, 2008, http://crunchgear.com/2008/11/04/combination-iphone-battery-pack-and-flash-from-fastmac/.

(56) References Cited

OTHER PUBLICATIONS

"Cheap DIY iPhone External Battery," dated Jul. 22, 2008, http://fastdad.wordpress.com/2008/07/22/cheap-diy-iphone-external-battery/.
Jeremy Horwitz, "iLuv i603 / i604 Rechargeable Lithium Polymer Batteries with Silicone Skin," dated Jun. 27, 2006, http://www.ilounge.com/index.php/reviews/entry/iluv-i603-rechargeable-lithium-polymer-battery-with-silicone-skin/.
Julie Strietelmeier, "Seidl° INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.
"PowerSkin Samsung Galaxy S3 Case with Backup Battery," dated Aug. 19, 2012 , http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogds/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.
Jeremy Horowitz, "PhoneSuit MiLi Power Pack for iPhone," Jan. 29, 2009, http://www.ilounge.com/index.php/reviews/entry/phonesuit-mili-power-pack-for-iphone/.
Jeremy Horowitz, "FastMac TruePower iV Universal Battery Charger," Dec. 11, 2008, http://www.ilounge.com/index.php/reviews/entry/fastmac-truepower-iv-universal-battery-charger/.
Jeremy Horowitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feburary 21, 2008.
AVR458: Charging Lithium-Ion Batteries with ATAVRBC100, which appear to include a date of Aug. 2008.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
Amazon.com, "Galaxy S6 Battery Case, i-Blason External Protective Battery Case/Cover for Samsung Galaxy S6 2015 Release." Customer Review published Mar. 29, 2015. Retrieved from internet at <http://www.amazon.com/Case-i-Blason-External-Protective-Versions/dp/B00SNS4LME>, Apr. 28, 2016. 7 pages.
Case-Ari, *LLC* v. *mStation, Inc.*, Case No. 1:2010-CV-01874 in the United States District Court for the Northern District of Georgia, filed Jun. 17, 2010.
*Daniel Huang* v. *GC Technology, LLC*, Case No. CV10-4705 Cas (VBKx) in the United States District Court for the Central District of California, filed Jun. 24, 2010.
*Hali-Power, Inc.* v. *mStation Corp.*, Case No. 1:2010-CV-00773 in the United States District Court for the Northern District of New York, filed Jun. 30, 2010.
*Mophie, Inc.* v. *Loza & Loza, LLP*, Case No. SACV11-00539 DOC (MLGx) in the United States District Court for the Central District of California, filed Apr. 7, 2011.
Mophie's Complaint, filed Apr. 7, 2011 in *Mophie, Inc.* v. *Loza & Loza, LLP*, Case No. SACV11-00539 Doc (MLGx) in the United States District Court for the Central District of California.
*Mophie, Inc.* v. *Foreign Trade Corporation*, Case No. 8:12-CV-00292-JST-RNB in the United States District Court for the Central District of California, filed Feb. 24, 2012.
*Mophie, Inc.* v. *Kdlinks Inc.*, Case No. 2:2012-CV-02639 in the United States District Court for the Central District of California, filed Mar. 27, 2012.
*Otter Products, LLC* v. *Mophie, LLC*, Case No. 1:2012-CV-01969 in the United States District Court for the District of Colorado, filed Jul. 27, 2012.

(56) References Cited

OTHER PUBLICATIONS

Mophie's Answer, filed Oct. 15, 2012 in *Otter Products, LLC* v. *Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC* v. *Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC* v. *Mophie, LLC*, Case No. 1:2012-CV-01969 in the United States District Court for the District of Colorado.
Mophie's Claim Construction Brief, filed Jun. 14, 2013 in *Otter Products, LLC* v. *Mophie, LLC*, Case No. 1:2012-CV-01969 in the United States District Court for the District of Colorado.
Otter's Claim Construction Brief, filed Jun. 14, 2013 in *Otter Products, LLC* v. *Mophie, LLC*, Case No. 1:2012-CV-01969 in the United States District Court for the District of Colorado.
Mophie's Brief in Response to Otter's Claim Construction Brief, filed Jun. 24, 2013 in *Otter Products, LLC* v. *Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC* v. *Mophie, LLC*, Case No. 1:2012-Cv-01969 in the United States District Court for the District of Colorado.
Otter's Reply in Support of Motion for Summary Judgment of Infringement, filed Jun. 24, 2013 in *Otter Products, LLC* v. *Mophie, LLC*, Case No. 1:2012-CV-01969 in the United States District Court for the District of Colorado.
Joint Claim Construction Statement, filed Jun. 26, 2013 in *Otter Products, LLC* v. *Mophie, LLC*, Case No. 1:2012-CV-01969 in the United States District Court for the District of Colorado.
*Incase Designs, Inc.* v. *Mophie, Inc.*, Case No. 3:2013-CV-00602 in the United States District Court for the Northern District of California, filed Feb. 12, 2013.
Mophie's Amended Answer and Counterclaims, filed May 8, 2013 in *Incase Designs, Inc.* v. *Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc.* v. *Mophie, Inc.*, Case No. 3:2013-CV-00602 in the United States District Court for the Northern District of California.
Mophie's Reply in Support of Motion to Stay and Supporting Declaration, filed Sep. 3, 2013 in *Incase Designs, Inc.* v. *Mophie, Inc.*, Case No. 3:2013-CV-00602 in the United States District Court for the Northern District of California.
*Incase Designs, Inc.* v. *Mophie, Inc.*, Case No. 3:2013-CV-03356 in the United States District Court for the Northern District of California, filed Jul. 18, 2013.
*Incase Designs, Corp.* v. *Mophie, Inc.*, Case No. 3:2013-CV-04314 in the United States District Court for the Northern District of California, filed Sep. 18, 2013.
Mophie Motion 1—To Be Accorded Benefit, filed Nov. 20, 2013 in Patent Interference No. 105,946(RES).
Declaration of John Feland, Ph.D, In Support of Mophie Motion 1 to Be Accorded Benefit, dated Nov. 20, 2013, in Patent Interference No. 105,946(RES).
Mophie Motion 2—For Judgment that Incase's Involved Claims Are Unpatentable, filed Nov. 20, 2013 in Patent Interference No. 105,946(RES).
Declaration of John Feland, Ph.D, In Support of Mophie Motion 2 for Judgement That Incase's Involved Claims Are Unpatentable, dated Nov. 20, 2013, in Patent Interference No. 105,946(RES).
Incase Motion 1—Motion for Benefit, filed Nov. 20, 2013 in Patent Interference No. 105,946(RES).
Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc.* v. *Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc.* v. *Source Vista*, Case No. 8:13-CV-01321 in the United States District Court for the Central District of California.
Shah's Answer, Affirmative Defenses, and Counterclaims to Plaintiff's Fifth Amended Complaint, filed Sep. 24, 2014, in *Mophie, Inc.* v. *Source Vista*, Case No. 8:13-CV-01321 in the United States District Court for the Central District of California.
Expert Report of Dr. David Munson, dated Aug. 28, 2014, in *Mophie, Inc.* v. *Source Vista*, Case No. 8:13-CV-01321 in the United States District Court for the Central District of California.
Expert Report of John Feland, Ph.D, dated Aug. 28, 2014, in *Mophie, Inc.* v. *Source Vista*, Case No. 8:13-CV-01321 in the United States District Court for the Central District of California.
Rebuttal Expert Report of John Feland, Ph.D, dated Sep. 25, 2014, in *Mophie, Inc.* v. *Source Vista*, Case No. 8:13-CV-01321 in the United States District Court for the Central District of California.
Rebuttal Expert Report of Dr. David Munson, dated Sep. 25, 2014, in *Mophie, Inc.* v. *Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc.* v. *Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc.* v. *Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc.* v. *Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc.* v. *Source Vista*, Case No. 8:13-CV-01321 in the United States District Court for the Central District of California.
John Feland, Ph.D. Deposition Transcript, dated Sep. 30, 2014, in *Mophie, Inc.* v. *Source Vista*, Case No. 8:13-CV-01321 in the United States District Court for the Central District of California.
Matthew Brand Deposition Transcript, dated Jul. 23, 2014, in *Mophie, Inc.* v. *Source Vista*, Case No. 8:13-CV-01321 in the United States District Court for the Central District of California.
Dharmesh Shah Deposition Transcript, dated Jul. 11, 2014, in *Mophie, Inc.* v. *Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc.* v. *Source Vista*, Case No. 8:13-CV-01321 in the United States District Court for the Central District of California.
Memorandum of Points and Authorities in Support of Mophie's Motion for Summary Judgment, filed Sep. 22, 2014, in *Mophie, Inc.* v. *Source Vista*, Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc.* v. *Source Vista*, Case No. 8:13-CV-01321 in the United States District Court for the Central District of California.

(56) References Cited

OTHER PUBLICATIONS

Mophie's Opposition to Shah and Serve Global's Motion for Partial Summary Judgment, dated Oct. 3, 2014, in *Mophie, Inc.* v. *Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc.* v. *Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc.* v. *Source Vista*, Case No. 8:13-CV-01321 in the United States District Court for the Central District of California.
Defendants' Opposition to Plaintiff's Motion for Summary Judgment, filed Oct. 3, 2014, in *Mophie, Inc.* v. *Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie, Inc.* v. *Source Vista*, Case No. 8:13-CV-01321 in the United States District Court for the Central District of California.
David Munson Deposition Transcript, dated Sep. 29, 2014, in *Mophie, Inc.* v. *Source Vista*, Case No. 8:13-CV-01321 in the United States District Court for the Central District of California.
Mophie's First Amended Complaint, filed Jun. 25, 2014, in *Mophie, Inc.* v. *Unu Electronics Inc.*, Case No. 8:13-CV-01705 in the United States District Court for the Central District of California.
UNU's Answer and Counterclaims, filed Jul. 10, 2014, in *Mophie, Inc.* v. *UNU Electronics Inc.*, Case No. 8:13-CV-01705 in the United States District Court for the Central District of California.
Mophie's Responses to Defendant's Third Set of Interrogatories (No. 12), dated Aug. 21, 2014, in *Mophie, Inc.* v. *UNU Electronics Inc.*, Case No. 8:13-CV-01705 in the United States District Court for the Central District of California.
Mophie's Responses to Defendant's First set of Requests for Admissions (Nos. 1-46), dated Aug. 19, 2014, in *Mophie, Inc.* v. *UNU Electronics Inc.*, Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc.* v. *UNU Electronics Inc.*, Case No. 8:13-CV-01705 in the United States District Court for the Central District of California.
Request for Ex Parte Reexamination of U.S. Pat. No. 8,367,235, filed Aug. 14, 2014.
Corrected Request for Ex Parte Reexamination of U.S. Pat. No. 8,367,235, filed Sep. 18, 2014.
Declaration of John Feland, Ph.D. in Support of Mophie's Opposition to Defendants Motion for Partial Summary Judgment, filed Oct. 3, 2014, in *Mophie, Inc.* v. *Source Vista*, Case No. 8:13-CV-01321 in the United States District Court for the Central District of California.
LivingSocial's Reply in Support of Motion for Summary Judgment, Filed Oct. 10, 2014, in *Mophie, Inc.* v. *Source Vista*, Case No. 8:13-CV-01321 in the United States District Court for the Central District of California.
Defendants' Reply in Support of Motion for Partial Summary Judgment, Filed Oct. 10, 2014, in *Mophie, Inc.* v. *Source Vista*, Case No. 8:13-CV-01321 in the United States District Court for the Central District of California.
Reply in Support of Mophie's Motion for Summary Judgment, Filed Oct. 10, 2014, in *Mophie, Inc.* v. *Source Vista*, Case No. 8:13-CV-01321 in the United States District Court for the Central District of California.
Mophie's Reply to Counterclaims of LivingSocial, filed Oct. 14, 2014, in *Mophie, Inc.* v. *Source Vista*, Case No. 8:13-CV-01321 in the United States District Court for the Central District of California.
Mophie's Reply to Counterclaims of Shah, filed Oct. 14, 2014, in *Mophie, Inc.* v. *Source Vista*, Case No. 8:13-CV-01321 in the United States District Court for the Central District of California.
Defendant's Response to Mophie's Fourth Set of Interrogatories, dated Sep. 23, 2014, in *Mophie, Inc.* v. *UNU Electronics Inc.*, Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc.* v. *UNU Electronics Inc.*, Case No. 8:13-CV-01705 in the United States District Court for the Central District of California.
Defendant's Preliminary Claim Constructions and Extrinsic Evidence, dated Oct. 14, 2014, in *Mophie, Inc.* v. *UNU Electronics Inc.*, Case No. 8:13-CV-01705 in the United States District Court for the Central District of California.
Plaintiff Mophie's Opening Brief on Claim Construction, filed Oct. 29, 2014, in *Mophie, Inc.* v. *UNU Electronics Inc.*, Case No. 8:13-CV-01705 in the United States District Court for the Central District of California.
Declaration of John Feland, Ph.D. in Support of Plaintiff's Preliminary Claim Constructions, filed Oct. 29, 2014, in *Mophie, Inc.* v. *UNU Electronics Inc.*, Case No. 8:13-CV-01705 in the United States District Court for the Central District of California.
Supplemental Declaration of John Feland, Ph.D. In Support of Plaintiff's Claim Constructions, filed Oct. 29, 2014, in *Mophie, Inc.* v. *UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc.* v. *UNU Electronics Inc.*, Case No. 8:13-CV-01705 in the United States District Court for the Central District of California.
Transcript of Deposition of John Feland, dated Oct. 21, 2014, in *Mophie, Inc.* v. *UNU Electronics Inc.*, Case No. 8:13-CV-01705 in the United States District Court for the Central District of California.
Defendant's Opening Claim Construction Brief, dated Oct. 29, 2014, in *Mophie, Inc.* v. *UNU Electronics Inc.*, Case No. 8:13-CV-01705 in the United States District Court for the Central District of California.
Order Granting Request for Ex Parte Reexamination of U.S. Pat. No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc.* v. *Source Vista*, Case No. 8:13-CV-01321 in the United States District Court for the Central District of California.
Mophie's Memorandum in Support of its Motion for Reconsideration, filed Nov. 19, 2014, in *Mophie, Inc.* v. *Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc.* v. *Source Vista*, Case No. 8:13-CV-01321 in the United States District Court for the Central District of California.
Order Denying Plaintiff's Motion for Reconsideration, dated Nov. 21, 2014, in *Mophie, Inc.* v. *Source Vista*, Case No. 8:13-CV-01321 in the United States District Court for the Central District of California.
Defendants Dharmesh Shah and Serve Global, LLC's Memorandum of Points and Authorities in Support of Defendants's Motion for Attorney's Fees, filed Mar. 21, 2015, in *Mophie, Inc.* v. *Source Vista*, Case No. 8:13-CV-01321 in the United States District Court for the Central District of California.
Memorandum of Points and Authorities in Support of Livingsocial, Inc.'s Motion for Legal Fees and Costs, filed Mar. 20, 2015, in *Mophie, Inc.* v. *Source Vista*, Case No. 8:13-CV-01321 in the United States District Court for the Central District of California.
Plaintiff Mophie, Inc.'s Opposition to Defendants Dharmesh Shah and Serve Global, LLC's Motion for Attorneys' Fees, filed Apr. 3,

(56) References Cited

OTHER PUBLICATIONS 2015, in *Mophie, Inc.* v. *Source Vista*, Case No. 8:13-CV-01321 in the United States District Court for the Central District of California.
Plaintiff Mophie, Inc.'s Opposition to Defendant Livingsocial, Inc.'s Motion for Attorneys' Fees, filed Apr. 3, 2015, in *Mophie, Inc.* v. *Source Vista*, Case No. 8:13-CV-01321 in the United States District Court for the Central District of California.
Reply to Plaintiff's Opposition to Defendants Dharmesh Shah and Serve Global, LLC's Motion for Attorney's Fees, filed Apr. 10, 2015, in *Mophie, Inc.* v. *Source Vista*, Case No. 8:13-CV-01321 in the United States District Court for the Central District of California.
Reply in Support of Livingsocial, Inc.'s Motion for Legal Fees and Costs, filed Apr. 10, 2015, in *Mophie, Inc.* v. *Source Vista*, Case No. 8:13-CV-01321 in the United States District Court for the Central District of California.
Amended Final Judgment and Permanent Injunction, dated Dec. 11, 2015, in *Mophie, Inc.* v. *Source Vista*, Case No. 8:13-CV-01321 in the United States District Court for the Central District of California.
Order Re Motions for Attorneys' Fees, Motion to Amend Permanent Injunction, Motions for Judgment as a Matter of Law, Motion for Relief From Judgment, and Motion for New Trial, dated Dec. 11, 2015, in *Mophie, Inc.* v. *Source Vista*, Case No. 8:13-CV-01321 in the United States District Court for the Central District of California.
Mophie's Complaint, filed Dec. 16, 2015, in *Mophie, Inc.* v. *Cute Mobile Inc.*, Case No. 8:15-CV-02086 in the United States District Court for the Central District of California.
Daniel Huang Deposition Transcript (Redacted) with Exhibit 121, dated Aug. 21, 2014, in *Mophie, Inc.* v. *Source Vista*, Case No. 8:13-CV-01321 in the United States District Court for the Central District of California.
Mophie's First Amended Complaint, filed May 25, 2016 in *Mophie, Inc.* v. *Cute Mobile Inc.*, Case No. 8:15-cv-02086 in the United States District Court for the Central District of California.
U.S. Appl. No. 16/132,272, filed Sep. 14, 2018, Huang et al.
U.S. Appl. No. 29/668,743, filed Nov. 1, 2018, Dang et al.
U.S. Appl. No. 29/668,770, filed Nov. 1, 2018, Dang et al.
U.S. Appl. No. 29/668,768, filed Nov. 1, 2018, Dang et al.
U.S. Appl. No. 29/668,774, filed Nov. 1, 2018, Dang et al.
U.S. Appl. No. 29/668,773, filed Nov. 1, 2018, Dang et al.
U.S. Appl. No. 29/668,766, filed Nov. 1, 2018, Dang et al.
U.S. Appl. No. 29/675,984, filed Jan. 7, 2019, Dang et al.
U.S. Appl. No. 29/675,991, filed Jan. 7, 2019, Dang et al.
U.S. Appl. No. 29/675,993, filed Jan. 7, 2019, Dang et al.
Nick Guy, "RND Power Solutions Sync & Charge Dock with Lightning Connector," dated Nov. 25, 2013, http://www.ilounge.com/index.php/reviews/entry/rnd-power-solutions-sync-charge-dock-with-lightning-connector.
Simon Hill, "The 10 Best iPhone 6 Extended Battery Cases to Keep the Power Flowing", Digital Trends, posted Jul. 23, 2015, accessed May 29, 2018, https://www.digitaltrends.com/mobile/best-iphone-6-battery-cases/.
"The Best iPhone 6 and iPhone 6 Plus Battery Cases", Engadget, posted Jun. 12, 2015, accessed May 29, 2018, https://www.engadget.com/2015/06/12/the-best-iphone-6-and-iphone-6-plus-battery-case/.
Jeremy Horwitz, "Review: Anker's Ultra Slim Battery Case for iPhone 6 offers a surprising mix of thinness, power, and low pricing", 9to5Mac, posted Mar. 13, 2015, accessed May 29, 2018, https://9to5mac.com/2015/03/13/review-ankers-ultra-slim-battery-case-iphone-6/.
Mophie's Complaint for Patent Infringement, filed Dec. 15, 2017 in *Zagg Inc.* and *Mophie, Inc.* v. *Anker Technology Co.*, Case No. 8:17-CV-2193 in the United States District Court for the Central District of California.
Anker's Answer, filed Mar. 12, 2018 in *Zagg Inc.* and *Mophie, Inc.* v. *Anker Technology Co.*, Case No. 8:17-CV-2193 in the United States District Court for the Central District of California.
Fantasia's Answer, filed Mar. 12, 2018 in *Zagg Inc.* and *Mophie, Inc.* v. *Anker Technology Co.*, Case No. 8:17-CV-2193 in the United States District Court for the Central District of California.
Mophie's Answer to Counterclaims of Anker, filed Apr. 2, 2018 in in *Zagg Inc.* and *Mophie, Inc.* v. *Anker Technology Co.*, Case No. 8:17-CV-2193 in the United States District Court for the Central District of California.
Mophie's Answer to Counterclaims of Fantasia, filed Apr. 2, 2018 in in *Zagg Inc.* and *Mophie, Inc.* v. *Anker Technology Co.*, Case No. 8:17-CV-2193 in the United States District Court for the Central District of California.
Anker's Amended Answer, filed Aug. 17, 2018 in *Zagg Inc.* and *Mophie, Inc.* v. *Anker Technology Co.*, Case No. 8:17-CV-2193 in the United States District Court for the Central District of California.
Fantasia's Amended Answer, filed Aug. 17, 2018 in *Zagg Inc.* and *Mophie, Inc.* v. *Anker Technology Co.*, Case No. 8:17-CV-2193 in the United States District Court for the Central District of California.
Mophie's Answer to Amended Counterclaims of Anker, filed Aug. 31, 2018 in *Zagg Inc.* and *Mophie, Inc.* v. *Anker Technology Co.*, Case No. 8:17-CV-2193 in the United States District Court for the Central District of California.
Mophie's Answer to Amended Counterclaims of Fantasia, filed Aug. 31, 2018 in *Zagg Inc.* and *Mophie, Inc.* v. *Anker Technology Co.*, Case No. 8:17-CV-2193 in the United States District Court for the Central District of California.
Anker's and Fantasia's Invalidity Contentions, dated Sep. 28, 2018 in *Zagg Inc.* and *Mophie, Inc.* v. *Anker Technology Co.*, Case No. 8:17-CV-2193 in the United States District Court for the Central District of California.
Preliminary Joint Claim Construction Chart, dated Jun. 4, 2018 in *Zagg Inc.* and *Mophie, Inc.* v. *Anker Technology Co.*, Case No. 8:17-CV-2193 in the United States District Court for the Central District of California.
Andrew Martonik, "Samsung Galaxy S7 Wireless Charging Battery Pack review," dated Apr. 22, 2016.
Simon Hill, "Incipio's Offgrid Galaxy S7 Edge case boosts battery life and supports wireless charging," dated Sep. 18, 2016.

* cited by examiner

MOBILE DEVICE CASE FOR RECEIVING WIRELESS SIGNALS

BACKGROUND

Field of the Invention

This disclosure relates to cases capable of receiving wireless signals for use with mobile electronic devices.

Description of the Related Art

Although various methods of providing mobile electronic devices with wireless signals are available, there remains a need for improved cases capable of receiving wireless signals for use with mobile electronic devices.

SUMMARY OF CERTAIN EMBODIMENTS

Certain embodiments are summarized below by way of example and are not intended to limit the scope of the claims.

Various embodiments disclosed herein can relate to a wireless case for use with a mobile electronic device. The wireless case can include a back wall configured to extend across at least a portion of a back of the mobile electronic device, a top wall configured to extend along at least a portion of a top of the mobile electronic device, a bottom wall configured to extend along at least a portion of a bottom of the mobile electronic device, a right side wall configured to extend along at least a portion of a right side of the mobile electronic device, a left side wall configured to extend along at least a portion of a left side of the mobile electronic device, and a front opening configured such that a display of the mobile electronic device is visible through the front opening.

The case can include a wireless receiver configured to extend across at least a portion of the back wall such that the wireless receiver can be configured to be behind the back of the mobile electronic device. The wireless receiver can be configured to receive wireless signals. The case can include a device interface that can be electrically coupled to the wireless receiver. The device interface can move between an engaged position and a disengaged position. In the engaged position, the device interface can be configured to engage a corresponding interface on the mobile electronic device to deliver the electrical signals from the wireless receiver to the mobile electronic device. In the disengaged position the device interface can be configured to disengage from the corresponding interface on the mobile electronic device to facilitate insertion of the mobile electronic device into the case or removal of the mobile electronic device from the case.

The wireless receiver can be configured to receive a wireless charging signal, such that the device interface can deliver electrical power to the mobile electronic device based on the wireless charging signal. The wireless receiver can comprises a wireless charging receiver coil. The wireless receiver can move with the device interface as the device interface moves between the engaged position and the disengaged position. The device interface can slide in a direction away from the top wall to move to the disengaged position, and can slide in a direction towards the top wall to move to the engaged position. The wireless case can include an opening in the bottom wall. The device interface can pass through the opening in the bottom wall to move from the engaged position to the disengaged position. The case can define an interior area between the back wall, the front opening, the top wall, the bottom wall, the right side wall, and the left side wall. The device interface can be positioned outside the interior area when in the disengaged position. The wireless receiver and the device interface can be coupled by a flexible connector. When the device interface is in the disengaged position, it can be movable to expose the corresponding interface of the mobile electronic device. The case can provide access for an external interface to engage the corresponding interface of the mobile electronic device when the device interface is in the disengaged position.

One or more of the back wall, the top wall, the bottom wall, the right side wall, and the left side wall can be flexible such that the mobile electronic device can pass through the front opening and be securely disposed within the wireless case. The wireless case can house a smartphone and can have an external shape that generally corresponds to an external shape of the smartphone. The wireless case can include an opening on a back side of the case that can provide access to an actuator for moving the device interface from the engaged position to the disengaged position. The actuator can include a grip configured to be manipulated by a user's finger. The wireless receiver and the device interface can be removed from the case. The wireless case can further comprise one or more guides that define a direction of motion and/or range of motion for the device interface. The back wall can comprise one or more tabs. A housing can contain the wireless receiver and can comprise one or more slots that allow the one or more tabs to pass therethrough. The back wall can include a recess for receiving the wireless receiver, wherein the recess can be larger than the housing to permit the wireless receiver and housing to move with the device interface.

Various embodiments disclosed herein can relate to a system for transferring wireless signals to or from a mobile electronic device. The system can include a case configured to at least partially enclose the mobile electronic device, a wireless antenna, and a device interface electrically coupled to the wireless antenna and configured to engage a corresponding interface on the mobile electronic device. One or both of the device interface and the wireless antenna can move relative to the case.

The system can be configured for wireless charging of a battery of the mobile electronic device. The wireless antenna can be a wireless charging receiver coil and can move within the case. The wireless antenna can be disposed in a housing. The case can comprise a recess configured to receive the wireless antenna. The recess can be larger than the housing so that the housing and wireless antenna can move within the recess. The device interface can move between an engaged position and a disengaged position. The wireless antenna can move with the device interface between the engaged position and the disengaged position. The device interface can move through an opening in the case when moving from the engaged position to the disengaged position. At least a majority of the device interface can be positioned outside of the case when in the disengaged position. The wireless antenna and the device interface can be coupled by a flexible connector. The device interface can move to expose the corresponding interface on the mobile electronic device through the case, such that an external interface can engage the corresponding interface on the mobile electronic device. At least a portion of the case can be flexible. The case can be configured to house a smartphone. The case can have an external shape that generally corresponds to an external shape of the smartphone. An opening through the case can provide access to an actuator configured to move the device interface. The actuator can be configured to be engaged by a user's finger to pull the device interface out of the corresponding interface on the mobile electronic device.

BRIEF DESCRIPTION OF THE DRAWINGS

The following drawings and the associated descriptions are provided to illustrate example embodiments of the present disclosure and do not limit the scope of the claims.

DETAILED DESCRIPTION OF CERTAIN EMBODIMENTS

Figure 1:
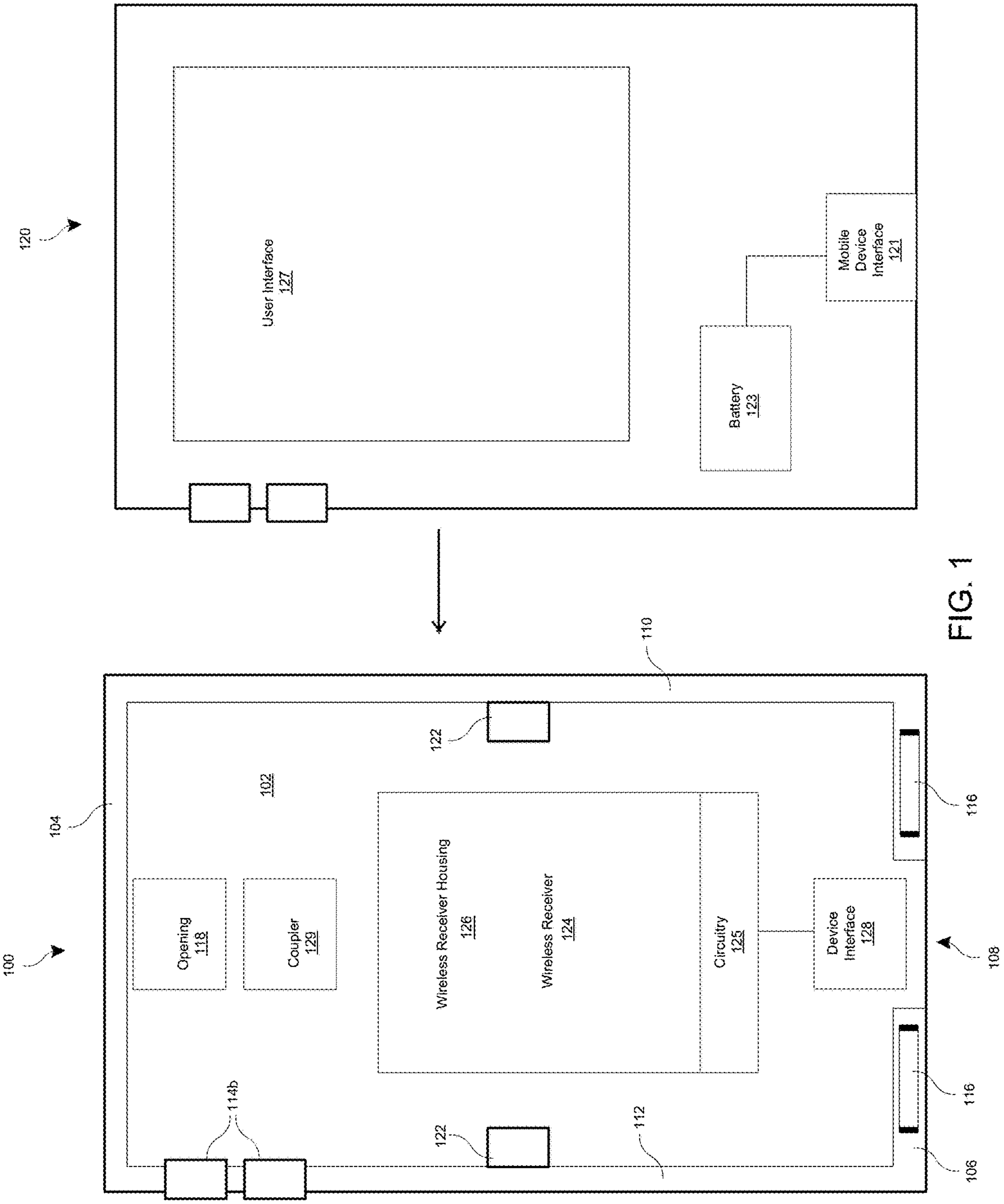
FIG. 1 is a schematic view of an example embodiment of a wireless case for use with a mobile electronic device.
Figure 2:
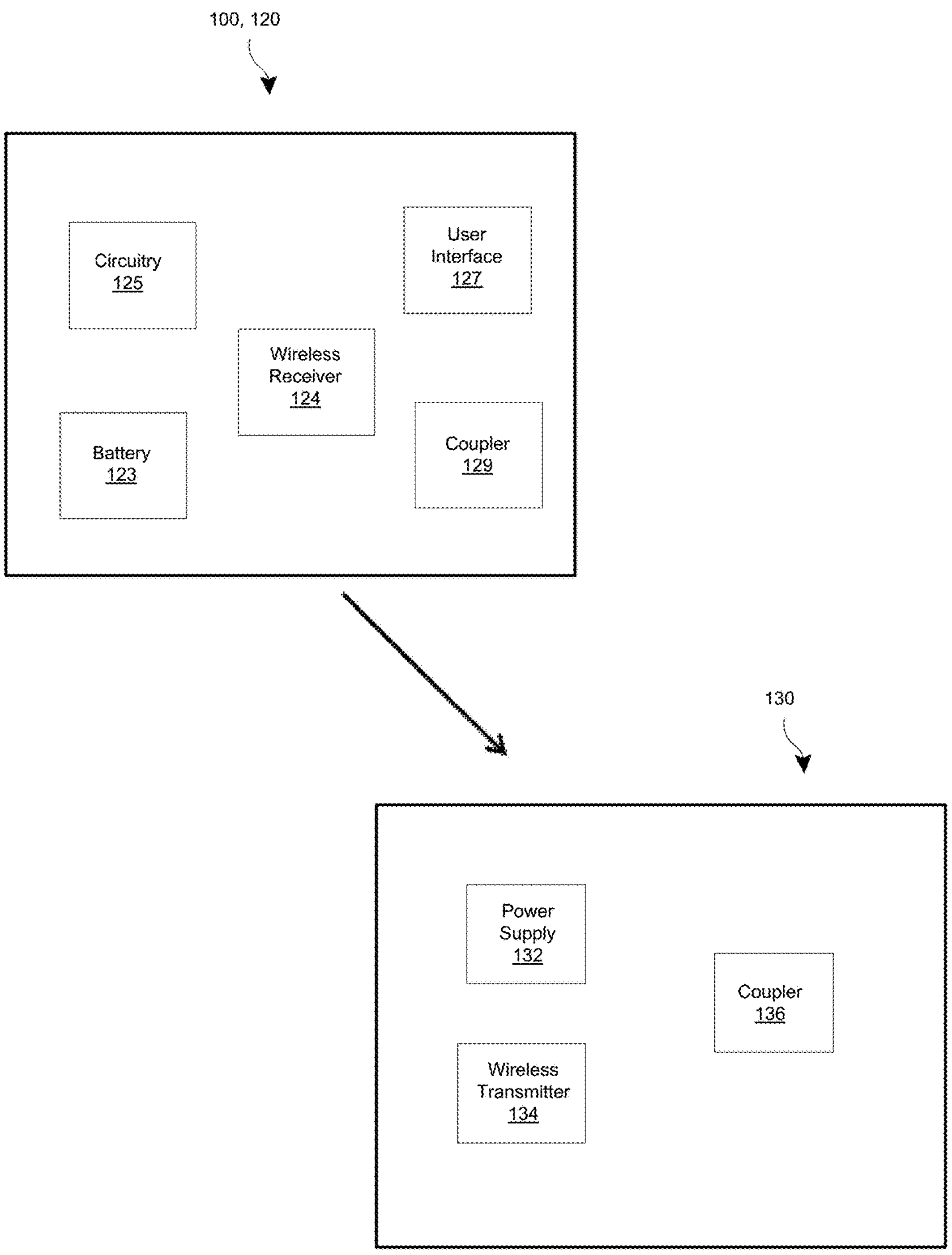
FIG. 2 is a schematic view of an example embodiment of a wireless case and a wireless charger.
Figure 3:
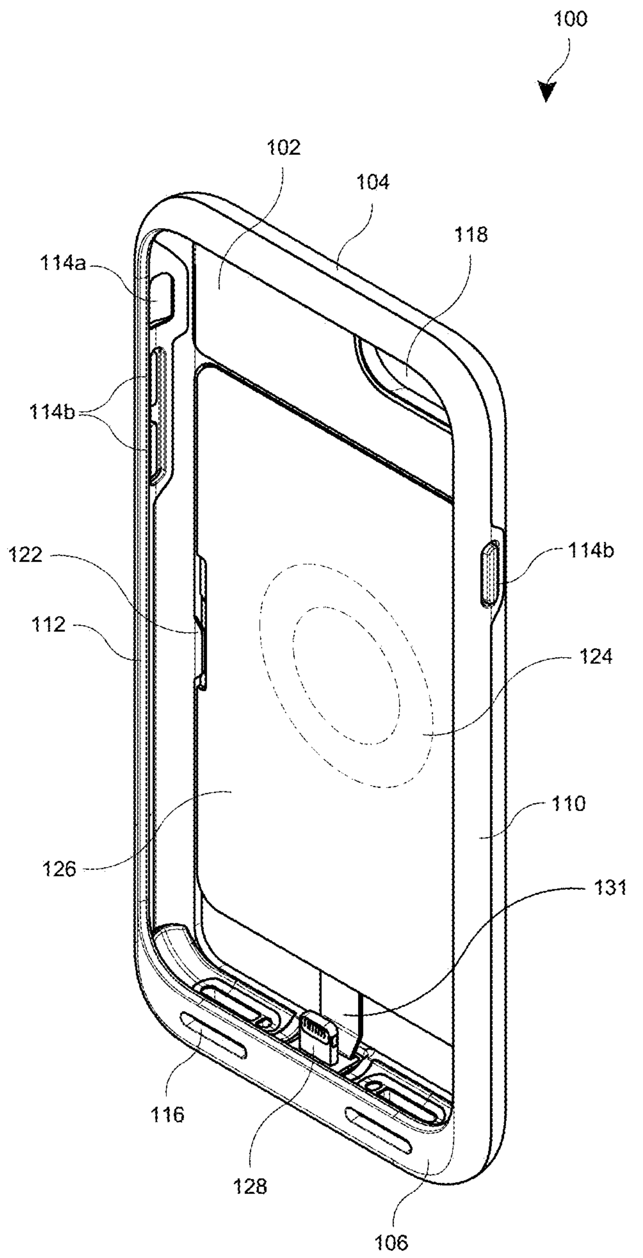
FIG. 3 is a front perspective view of an example embodiment of a wireless case with a wireless receiver in an engaged position.
Figure 4:
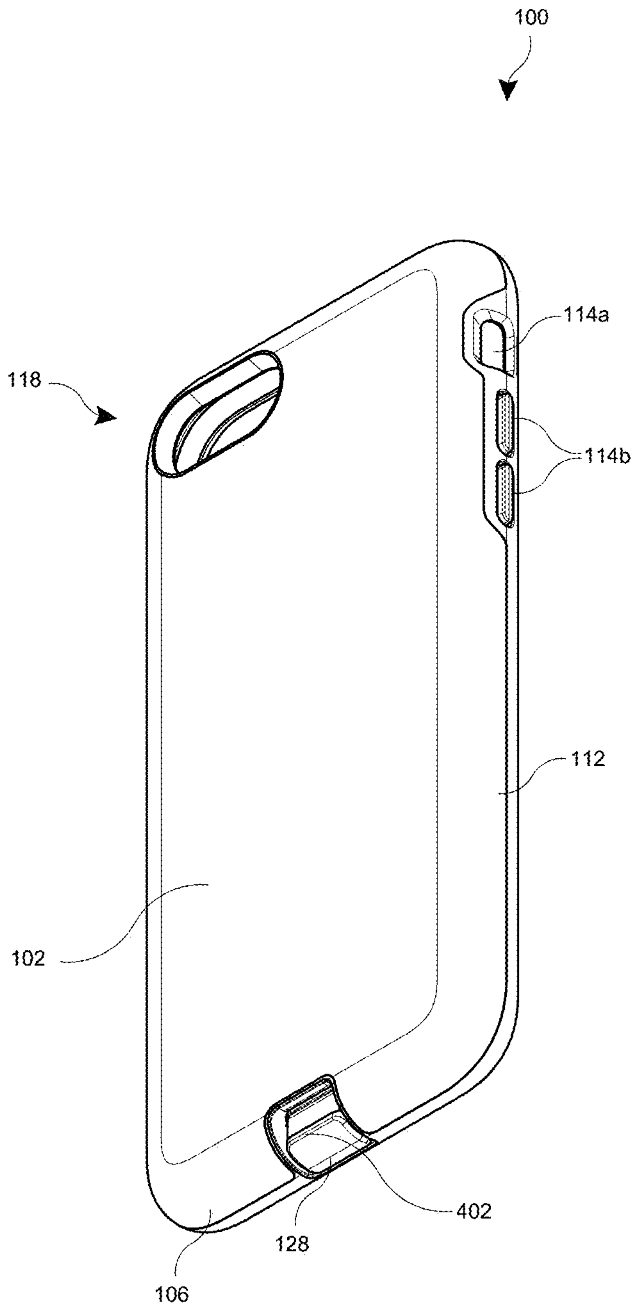
FIG. 4 is a rear perspective view of the wireless case of FIG. 3.
Figure 5:
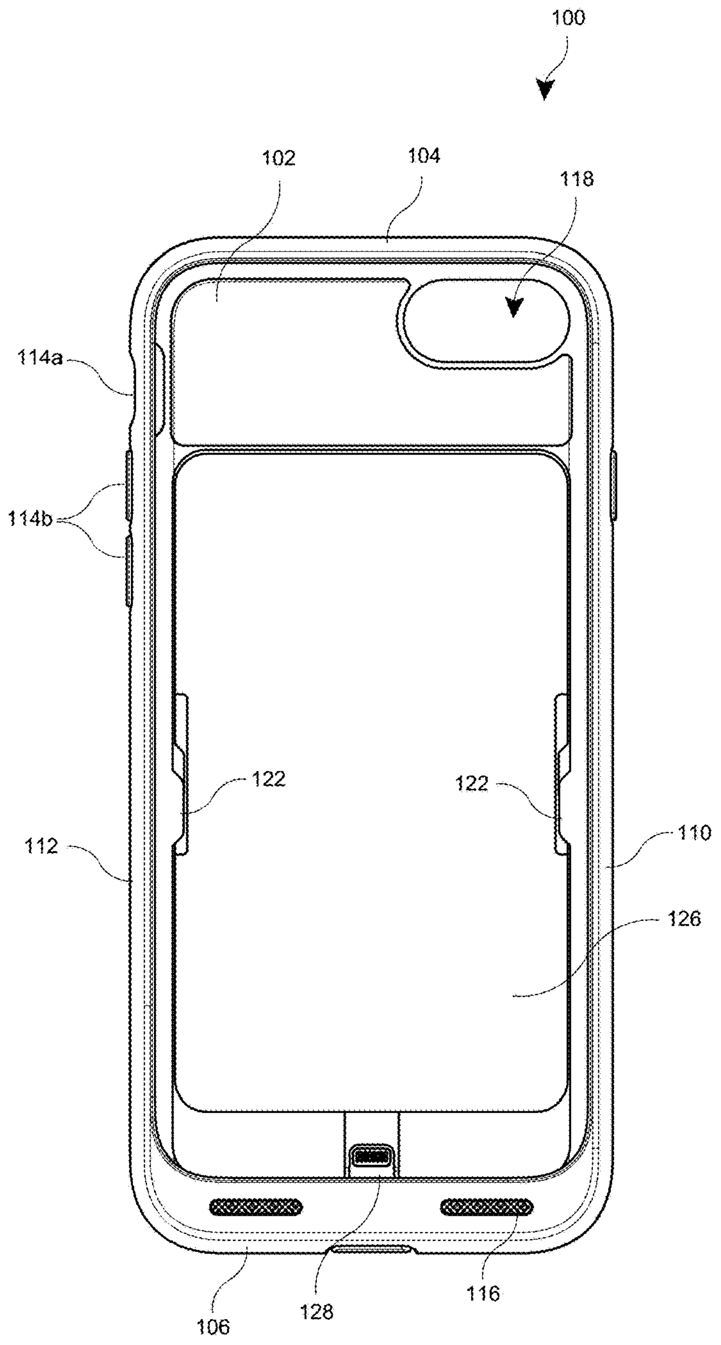
FIG. 5 is a front view of the wireless case of FIG. 3.

FIG. 1 is a schematic view of an example embodiment of a wireless case 100 for use with a mobile electronic device 120. FIG. 2 is a schematic view of an example embodiment of a wireless case 100 and a wireless signal base 130. FIG. 3 is a front perspective view of an example embodiment of a wireless case 100 in an engaged position. FIG. 4 is a rear perspective view of the wireless case 100 of FIG. 3. FIG. 5 is a front view of the wireless case 100 of FIG. 3.

The wireless case 100 can include a back wall 102 that is configured to extend across at least a portion of a back of the mobile electronic device 120. The case 100 can include a top wall 104 configured to extend along at least a portion of a top of the mobile electronic device 120. The case 100 can include a bottom wall 106 configured to extend along at least a portion of a bottom of the mobile electronic device 120. In some embodiments, the bottom wall 106 can comprise an opening 108. The case 100 can include a right side wall 110 configured to extend along at least a portion of a right side of the mobile electronic device 120. The case 100 can include a left side wall 112 configured to extend along at least a portion of a left side of the mobile electronic device 120. The case 100 can include a front opening configured such that a display (e.g., a touchscreen configured to receive a user input such as a touch input via a finger(s) or hand(s)) of the mobile electronic device 120 is visible through the front opening when the mobile electronic device 120 is in the case 100. One or more of the back wall 102, the top wall 104, the bottom wall 106, the right side wall 110, and the left side wall 112 can be flexible such that the mobile electronic device 120 can pass through the front opening and be securely disposed within the wireless case 100. The wireless case 100 can include one or more features (e.g., openings, button covers, and/or switch covers) that are configured to provide access to one or more corresponding features (e.g., buttons, ports, and/or switches) on the mobile electronic device 120. For example, an opening (not shown) through a wall of the case 100 can be disposed to align with an input port (e.g., a headphone jack) on the mobile electronic device 120. An opening 114*a* through a wall of the case 100 can be disposed to align with a button or switch (e.g., a mute switch) on the mobile electronic device 120 to enable a user to operate the button or switch through the opening 114*a*. Button covers 114*b* can be disposed to align with buttons (e.g., volume buttons and/or an on/off button) on the mobile electronic device 120 to enable a user to operate the buttons via the button covers 114. In some embodiments, the case 100 can include a switch cover that is configured to interface with a switch on the mobile electronic device 120 to operate the switch. One or more openings 116 can be disposed to transfer sound from a speaker on the mobile electronic device 120 out of the case 100 and/or to transfer sound to a microphone on the mobile electronic device 120. A camera opening 118 can be positioned (e.g., through the back wall 102) to align with a camera and/or camera flash on the mobile electronic device 120 so that the camera of the mobile electronic device 120 can operate while the mobile electronic device 120 is in the case 100.

The case 100 can comprise one or more tabs 122. In some embodiments the tabs extends from the back wall 102. In some embodiments the tabs can extends from the left side and/or right sight walls 110, 112. As will be discussed in greater detail below, these tabs 122 can be configured to interact with a wireless receiver housing 126, which can enclose a wireless receiver 124, such as a coil antenna. In some figures, the wireless receiver 124 is shown by dashed lines, which can indicate the location of the internal coil antenna. The wireless receiver housing 126 can have a sandwich structure, with the wireless receiver 124 disposed between a front housing piece and a rear housing piece. The additional circuitry 125 and/or other components (e.g., wire(s) connecting the wireless receiver to the device interface 128) can also be disposed between the front and rear housing pieces. The wireless receiver housing 126 can be flexible, in some embodiments, or it can be rigid, such as to protect the wireless receiver 124 or other electrical components inside the housing 126. The back wall 102 can include a recess for receiving the wireless receiver housing 126. The recess can be larger than the wireless receiver housing 126. The recess in the back wall 102 can be configured to allow motion of the wireless receiver housing 126 in a direction away from and towards the top wall 104 and the bottom wall 106, while inhibiting motion of the wireless receiver housing 126 in a direction away from and towards the left and right side walls 110, 112. Protrusions or ridges created by the recess can serve as a guide for the wireless receiver 124. For instance, the extent to which the wireless receiver housing 126 can travel upward or downward can be dictated by the shape of the recess. In some embodiments, the range of motion of the wireless receiver housing 126 may be dictated by one or more protrusions in the back wall 102, left side wall 112, and/or right side wall 110. In some embodiments, the range of motion of the wireless receiver housing 126 is dictated by one or more of the back wall 102, the top wall 104, the left side wall 112, and right side wall 110.

The case 100 can have an external shape that generally corresponds to the external shape of the mobile electronic device 120. Accordingly, a case 100 designed for use with a smartphone can have an external shape that generally corresponds to the external shape of the smartphone. Accordingly, the case 100 with the smartphone therein can be used in the same manner as the smartphone without the case 100.

For example, the case 100 with the smartphone therein can be placed in a user's pocket, can be held in a single hand with the thumb operating the touchscreen, can comfortably be held to the user's face when talking on the phone, etc. The case 100 can provide protection to the mobile electronic device 120 that is disposed therein.

As illustrated in FIG. 2, the case 100 can include a coupler 129, such as one or more magnets to facilitate alignment with a wireless charger 130 (such as a docking station, a charging pad, or a wireless external battery pack) that supports or provides wireless charging capabilities. Such alignment may facilitate proper coupling of the case 100 to the wireless charger 130 so that the wireless receiver 124 of the case 100 is properly positioned relative to the wireless transmitter 134 of the charger 130 to enable, improve, or optimize wireless charging. For example, the charger 130 may also include one or more magnets, such that when the case 100 is placed within magnetic range of the charger 130, the one or more magnets in the case 100 are pulled towards and aligned with the one or more magnets in the charger 130. Respective wireless charging input and/or output interfaces in the case 100 and the charger 130 may be positioned such that when the one or more magnets of the case 100 align with the one or more magnets of the charger 130, the wireless input/output interfaces may also be aligned or otherwise in sufficiently close proximity to enable wireless transfer of electrical power. The charger 130 may comprise a power supply 132, which can provide electrical power to the wireless transmitter 134 of the charger 130. The power supply 132 can be configured to receive electrical power from an external source (e.g., an electrical outlet). In some embodiments, the power supply 132 can be a battery, such as for a wireless external battery pack, such as described in connection with FIG. 10. The wireless charger 130 can include a wireless transmitter 134 (e.g., a wireless transmitter coil or other suitable antenna) configured to transmit wireless signals to the case 100.

The wireless charger 130 can include a coupler 136 configured to couple the case 100 with the charger 130 in a predefined position and/or orientation. In some embodiments, the coupler 136 comprises one or more magnets configured to attract with one or more magnets on the case 100. As illustrated in FIG. 2, the case 100 containing the mobile electronic device 120 can be placed adjacent to (e.g., on top of) the charger 130 in order to begin receiving wireless signals. By way of example, if a user places the case 100 onto the charger 130, but at a location where the wireless transmitter 134 and the wireless receiver 124 are positioned further apart than desired, the forces (e.g., attraction) between the magnet(s) of the case 100 and the magnet(s) of the charger 130 can cause the case 100 to move so as to bring the wireless receiver 124 closer to the wireless transmitter 134. In some embodiments, the orientation of the wireless receiver 124 relative to the wireless transmitter 134 can affect the wireless charging, and the couplers 129 and 136 can be configured to position the case 100 relative to the charger 130 such that the wireless receiver 124 is oriented relative to the wireless transmitter 134 at a charging orientation that is configured to enable, improve, or optimize wireless charging. By way of example, if a user places the case 100 onto the wireless charger 130 at an orientation that is offset rotationally by 20 degrees from the charging orientation, the forces (e.g., attraction and/or repulsion) between the magnet(s) of the case 100 and the magnet(s) of the charger 130 can rotate the case by 20 degrees to the charging orientation. In some embodiments, the system can have a single charging orientation. In some embodiments, the system can have multiple suitable charging locations (e.g., four charging locations offset from each other by 90 degrees). Many alternatives are possible. In some embodiments, the coupler 129 may be a latching or clipping mechanism configured to secure the case 100 to the charger 130 in a proper orientation. In some embodiments, the shape or design of the charger 130 and/or the case 100 may encourage a user to place the case 100 on the charger 130 in the proper orientation.

The case 100 can include a wireless receiver 124. The wireless receiver 124 can extend across at least a portion of the back wall 102 such that the wireless receiver 124 can be configured to be behind (rearward) of the back of the mobile electronic device 120. The wireless receiver 124 can be configured to receive wireless signals, such as inductive charging signals for charging the mobile electronic device 120 or data transfer (e.g., via electrical circuitry 125 inside the wireless receiver housing 126). For example, wireless charging signals can be received by the wireless receiver 124 via electromagnetic fields provided by the wireless charger 130 (e.g., through magnetic resonance, inductive power transfer, or any other kind of wireless signal transfer). In some embodiments, the wireless receiver 124 can be configured to transfer data to and/or from the mobile electronic device 120 while the mobile electronic device 120 is in the case 100. Accordingly, the mobile electronic device 120 can use the wireless receiver 124 of the case 100 to wirelessly sync with or otherwise communicate with an external computing device while in the case 100. Thus, in some embodiments, the wireless receiver 124 of the case 100 can be used for transmitting wireless signals (e.g., for data communication to an external computing device) in addition to, or instead of, receiving wireless signals. For example, the external computing device can have features similar to those discussed in connection with the wireless charger 130, wherein the wireless transmitter 134 is configured to wirelessly send and/or receive data to and/or from the wireless receiver 124 of the case 100. The external computing device can have a hardware processor and computer readable memory for sending and/or receiving data to and/or from the wireless transmitter 134 for communicating with the mobile device through the case 100. The external computing device can include the coupler 136 and/or the power supply 132, as described in connection with FIG. 2. In some embodiments, the charger 130 can connect with an external computing device. The charger 130 can then wirelessly provide the data to the wireless receiver 124. Data can be sent from the wireless receiver 124 to the device interface 128 via electrical circuitry 125 such that the data can be transferred to the mobile electronic device 120 via the device interface 128 that is coupled to the mobile device interface 121. Data from the mobile electronic device 120 can be received by the device interface 128, can be transferred to the wireless receiver 124, and can be output from the wireless receiver 124 to the base 130 and then to the external computing device. In some embodiments, the data can be wirelessly communicated directly to and/or from the external computing device, as discussed herein.

Figure 9:
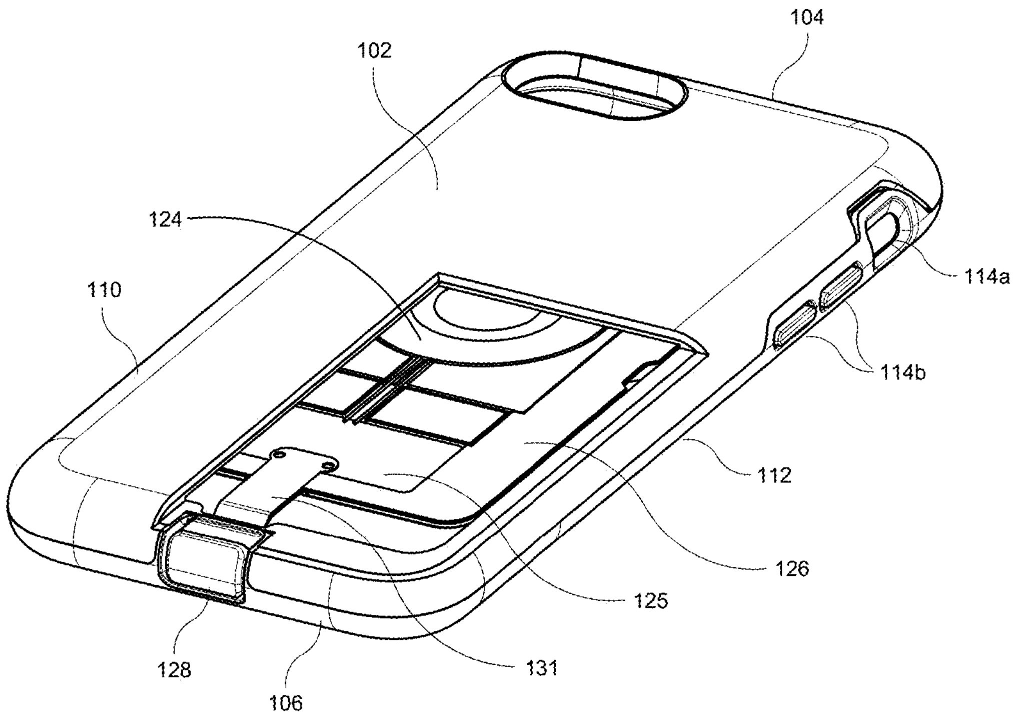
FIG. 9 is a partial cutaway view of the wireless case.

The wireless receiver 124 can receive electrical power from a power source, such as a charging pad. The wireless receiver 124 can be configured to receive a wireless charging signal. For example, the wireless receiver 124 can be enclosed inside a housing 126, which can be configured to contain a wireless charging receiver coil and other circuitry 125 (see FIG. 9). By way of example, the other circuitry 125 can include an alternating current (AC) to direct current (DC) converter, a voltage regulator, a current limiter, and/or other electrical components to facilitate charging of the mobile electronic device 120 (e.g., the battery 123 thereof) using the signals received by the wireless receiver 124. The housing can comprise one or more slots or indentations 135 that allow the one or more tabs 122 on the case 100 to pass therethrough (e.g., for insertion or removal of the wireless receiver housing 126). The wireless receiver housing 126 and the wireless receiver 124 can move within the recess formed in the back wall 102, as described above. In some embodiments, the wireless receiver housing 126 can slide in a direction away from the top wall 104 to move to a lower, or disengaged position, and can slide in a direction towards the top wall 104 to move to an upper, or engaged position. The wireless case 100 can further comprise one or more guides (e.g., tabs 122) that define a direction of motion and/or range of motion for the wireless receiver housing 126. The guides 133 of the wireless receiver housing 126 can be configured to interact with the guides (e.g., tabs 122) of the case 100 to define a range of motion for the wireless receiver housing 126. The one or more guides 133 can include thinned portion(s) of the housing that are thinner than the surrounding portions, so that the thinned portion(s) can fit under the one or more tabs 122 of the case 100. As the wireless receiver housing 126 moves within the range of motion, the thinned portion(s) of the housing can slide under the tab(s) 122. When the tab(s) 122 reach the end of the thinned portion(s) the tab(s) 122 can abut against the surrounding, thicker, portions of the housing to impede further motion of the housing 126 beyond the range of motion.

In some embodiments, the wireless receiver 124 is a wireless antenna, such as a coil antenna. As a non-limiting example, the wireless charger 130 can comprise a transmitter circuit and a transmitter coil. The transmitter circuit can send alternating current to the transmitting coil. The alternating current flowing within the transmitter coil can create a magnetic field, which extends to a receiver coil (when the case 100 is within a threshold distance from the base 130). The magnetic field generates alternating current within the receiver coil, which is converted into direct current (e.g., by an AC-DC converter in the other circuitry 125). The direct current can then be transmitted to the mobile electronic device 120 (e.g., for charging the battery 123).

Figure 6:
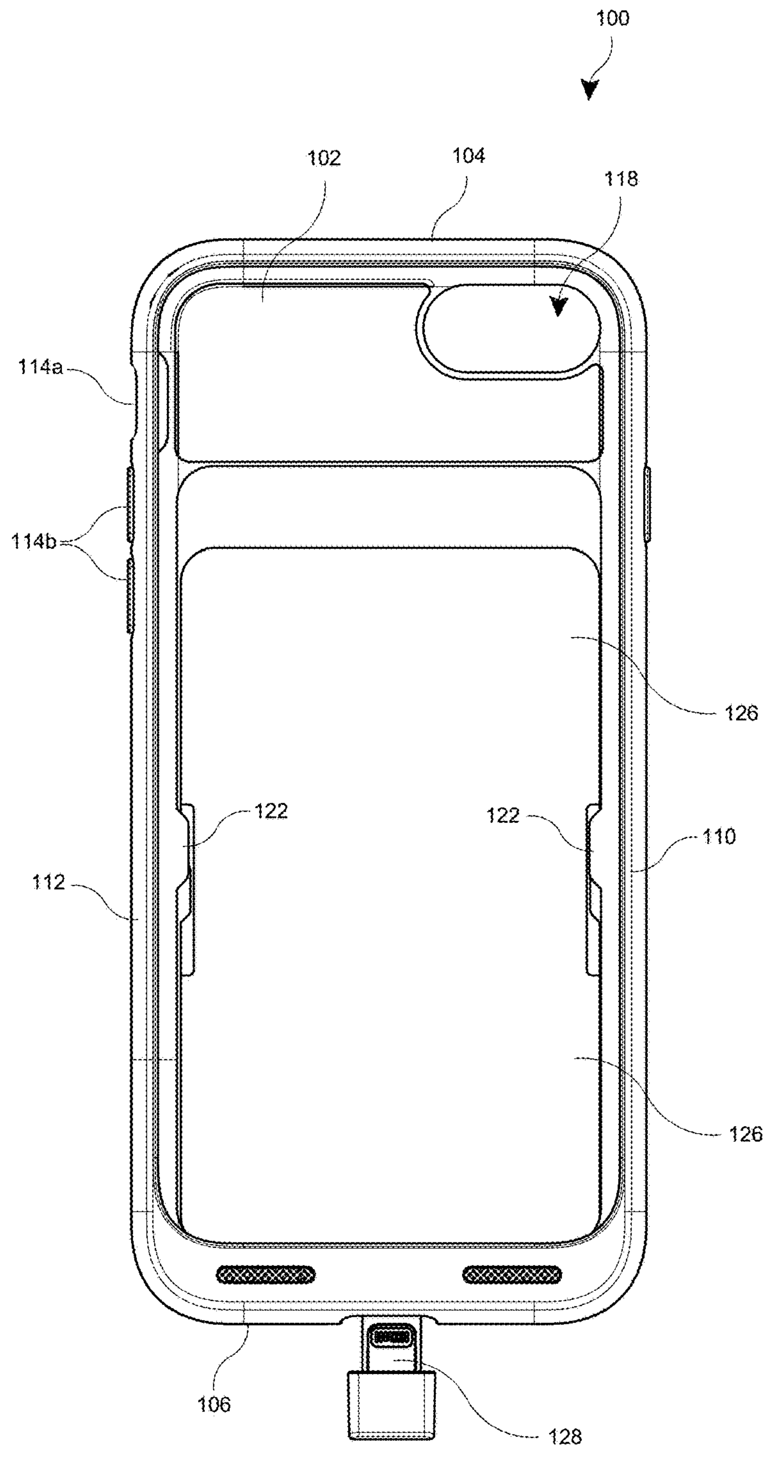
FIG. 6 is a front view of the wireless case of FIG. 3 with the wireless receiver in a disengaged position.

The case 100 can include a device interface 128 that can be electrically coupled to the wireless receiver 124 (e.g., via electrical circuitry 125). In some embodiments, the device interface 128 can be an electrical connector that is configured to engage the mobile device interface 121 on the mobile electronic device. In some implementations, the electrical connector can extend from a movable base that is coupled to the wireless receiver housing 126. In other implementations, the electrical connector can extend upward from the bottom wall 106 of the case 100, although other locations can be used, such as extending inward from the left side wall 112 or the right side wall 110, depending on the corresponding location of the mobile device interface 121. As illustrated in FIGS. 5 and 6, the device interface 128 can move between an engaged position (see FIG. 5) and a disengaged position (see FIG. 6). The wireless receiver 124 (e.g., inside the wireless receiver housing 126) can move with the device interface 128 as the device interface 128 moves between the engaged position and the disengaged position. The device interface 128 can slide in a direction away from the top wall 104 to move to the disengaged position, and can slide in a direction towards the top wall 104 to move to the engaged position. The device interface 128 can pass through the opening in the bottom wall 106 to move from the engaged position to the disengaged position. The wireless case 100 can further comprise one or more guides that define a direction of motion and/or range of motion for the device interface 128 (e.g., the walls of the opening 108). The case 100 can define an interior area between the back wall 102, the front opening, the top wall 104, the bottom wall 106, the right side wall 110, and the left side wall 112. The device interface 128 can be positioned outside the interior area when in the disengaged position. The device interface 128 can be positioned below the lower wall 106 when in the disengaged position. In some embodiments the device interface 128 can include an actuator 402, as shown in FIG. 4, for moving the device interface 128 to and from the engaged position to the disengaged position. The actuator 402 can include a grip configured to be manipulated by a user's finger. In some embodiments, the wireless case 100 can include an opening on a back side of the case 100 that can provide access to the actuator. In some embodiments, the opening on the back side of the case 100 can be an extension of the opening in the bottom wall 106.

In the engaged position, the device interface 128 can be configured to engage a corresponding mobile device interface 121 on the mobile electronic device 120 to deliver the electrical signals from the wireless receiver 124 to the mobile electronic device 120. For example, the device interface 128 can be a Lightning™ connector, a Micro-USB connector, or other type of electrical connector, which can be configured to engage a corresponding Lightning™ port, Micro-USB port, or other electrical port on the mobile electronic device 120. In the disengaged position the device interface 128 can be configured to disengage from the corresponding mobile device interface 121 on the mobile electronic device 120. This may be done to facilitate insertion of the mobile electronic device 120 into the case 100 or removal of the mobile electronic device 120 from the case 100. In the disengaged position the wireless case 100 can permit a mobile electronic device 120 (e.g., a cell phone such as an iPhone®, other smartphone, or tablet computer) to be inserted into, and/or removed from, the case 100, such as through the front opening. The device interface 128 can deliver electrical power to the mobile electronic device 120 based on the wireless charging signal.

Figure 7:
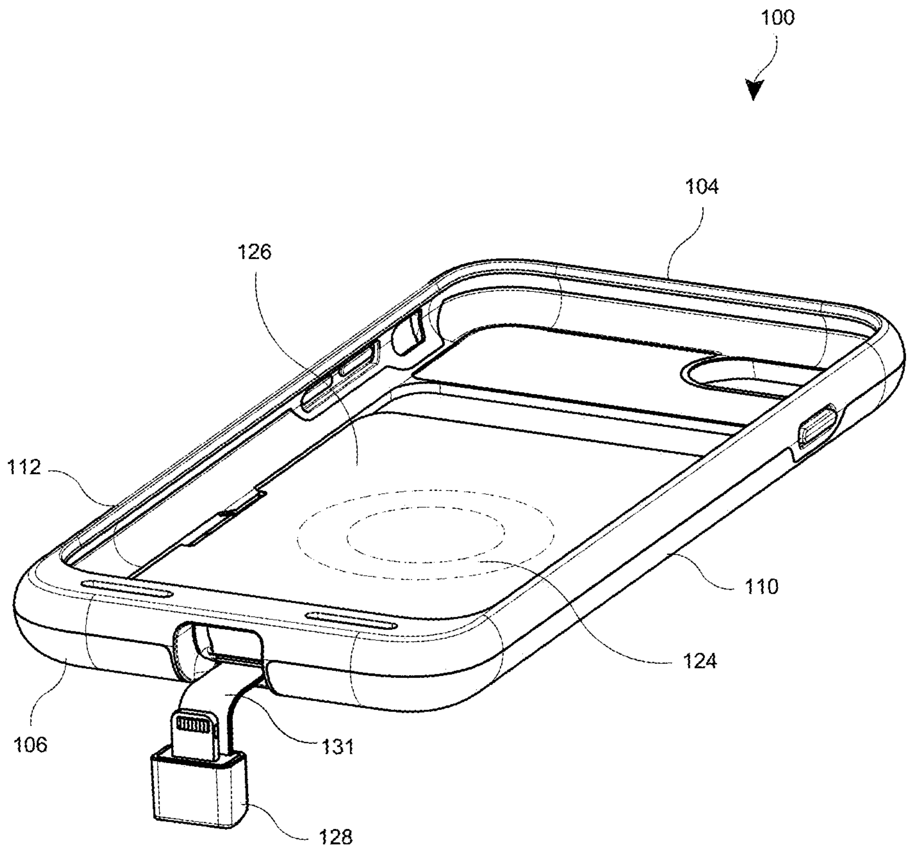
FIG. 7 is a perspective view of the wireless case of FIG. 6 with the device interface moved so as to not block an opening in a bottom wall of the wireless case.

In some embodiments, the device interface 128 and the wireless receiver 124 are electrically coupled via a flexible connector 131. It will be understood that even in the disengaged position, the device interface 128 may block the opening 108 and thereby block access to the corresponding interface of the mobile electronic device 120. Therefore, as illustrated in FIG. 7, the device interface 128 can be configured such that when the device interface 128 is in the disengaged position, it can be movable (e.g., by bending the flexible connector 131) to expose the corresponding interface 121 of the mobile electronic device 120. By moving the device interface 128 to expose the corresponding interface on the mobile electronic device 100, the case 100 can provide access for an external interface to engage the corresponding interface 121 of the mobile electronic device 120 (e.g., through the opening 108) when the device interface 128 is in the disengaged position. When coupled with an external interface, data can be transferred to and/or from the mobile electronic device 120 while the mobile electronic device 120 is in the case 100. Accordingly, the mobile electronic device 120 can sync with or otherwise communicate with an external computing device while in the case 100. For example, a cable can connect the external computing device to the corresponding interface 121 on the mobile electronic device 120 (e.g., through the opening 108, while the device interface 128 is displaced to the position shown in FIG. 7). Data can be sent from the external computing device via the cable to the corresponding interface 121 such that the data can be transferred to the mobile electronic device 120. Likewise, data can be sent from the mobile electronic device 120 to the external computing device via the cable. The mobile electronic device 120 (e.g., the battery 123 thereof) can be charged by a wired connection through a cable that extends through the opening 108, while the device interface 128 of the case 100 is in the displaced position down in FIG. 7.

Figure 8:
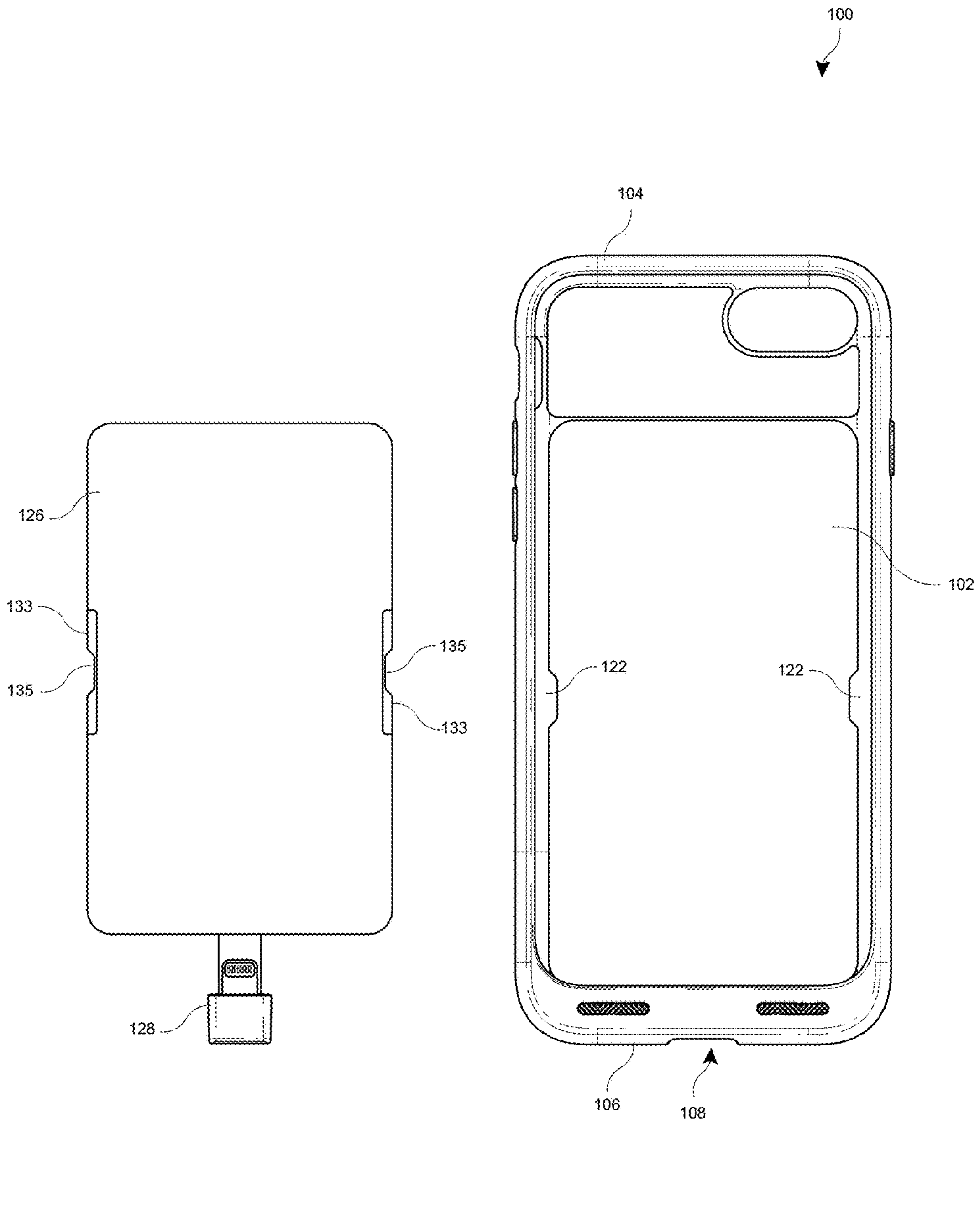
FIG. 8 is a front partial exploded view of the case with the wireless receiver removed from the wireless case.

As illustrated in FIG. 8, in some embodiments, the wireless receiver 124, the wireless receiver housing 126, and the device interface 128 can be entirely removed from the case 100 (e.g., in order to clean the case 100 or replace the wireless receiver 124 and/or device interface 128). In some embodiments, the wireless receiver 124 and device interface 128 can be removed from the case 100 by allowing the tabs 122 in the case 100 to pass through the slits or indentations in the wireless receiver housing 126, thereby removing the wireless receiver housing 126 from the recess, and to then cause the device interface 128 to travel toward the top wall 104 until the device interface 128 is no longer contained within the opening 108 in the bottom wall 106. The wireless receiver housing 126 and device interface 128 can be inserted by following the reverse process.

Figure 10:
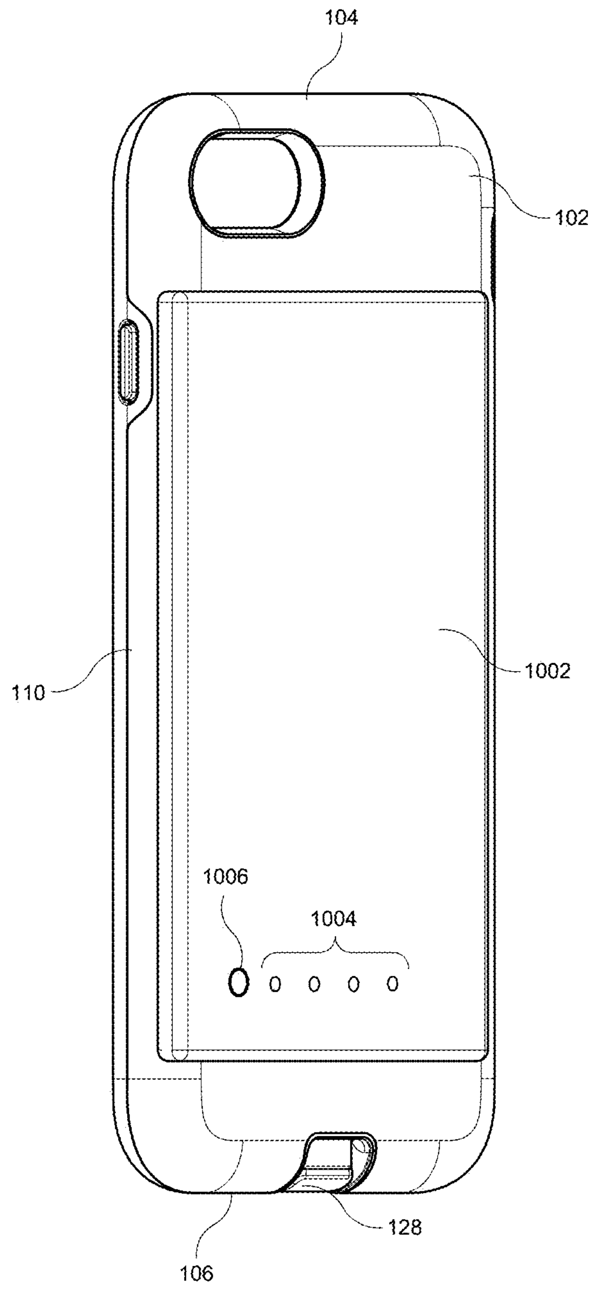
FIG. 10 is perspective view of a wireless external battery pack attached to the wireless case.

FIG. 10 is a perspective view of a wireless external battery pack 1002 attached to the wireless case 100. In some embodiments, the case 100 can be configured for use with a wireless external battery pack 1002. The wireless external battery pack 1002 may be configured to be attached to the external side of the back wall 102 of the case 100. The wireless external battery pack 1002 can be a wireless charger 130, and the features described in connection with the charger 130 can apply to the battery pack 1002. In some embodiments, the wireless external battery pack 1002 may comprise a coupling element, such as one or more magnets, which can operate as discussed herein in connection with the couplers 129 and 136 of FIG. 2. In some embodiments, the magnets are configured to operate with corresponding magnets in the case 100 in order to facilitate proper positioning and/or alignment of the wireless transmitter 134 and the wireless receiver 124, such as to provide, improve, or optimize wireless charging capabilities. Such positioning and/or alignment may facilitate proper coupling of the wireless external battery pack 1002 and the case 100 (e.g., to enable, improve, or optimize communication between the wireless transmitter 134 and the wireless receiver 124). For example, the case 100 may also include one or more magnets, such that when the case 100 is placed within magnetic range of the wireless external battery, the one or more magnets in the case 100 are pulled towards and/or aligned with the one or more magnets in the wireless external battery pack 1002. Respective wireless charging input and/or output interfaces in the case 100 and the wireless external battery pack 1002 may be positioned such that when the one or more magnets of the case 100 align with the one or more magnets of the base 130, the wireless input/output interfaces may also be aligned and/or otherwise in sufficiently close proximity to enable, improve, or optimize wireless transfer of electrical power.

The wireless external battery pack 1002 can include a charge indicator 1004, which can be configured to indicate a charge level of the battery in the wireless external battery pack 1002. The charge indicator 1004 can include a plurality of lights, such as light emitting diodes (LEDs), and the number of lights that are illuminated can indicate the amount of charge that the battery of the wireless external battery pack 1002 has. For example, four lights can be used, and one illuminated light can correspond to about 25% charge, two illuminated lights can correspond to about 50% charge, three illuminated lights can correspond to about 75% charge, and four illuminated lights can correspond to about 100% charge. In some embodiments, the charge indicator can use different colors, the intensity of light, or a display with a text or image representation to indicate the charge level of the wireless external battery pack 1002. In some embodiments, the wireless external battery pack 1002 can include a switch or button or other user input element 1006 configured to turn the wireless external battery 1002 on and off, to initiate or terminate wireless charging, or to provide other input to the wireless external battery pack 1002. In some embodiments, the battery pack 1002 can illuminate one or more of the lights of the charge indicator 1004 in response to input received by the user input element 1006.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A wireless case for use with a mobile electronic device, the wireless case comprising:

- a back wall configured to extend across at least a portion of a back of a mobile electronic device;
- a top wall configured to extend along at least a portion of a top of the mobile electronic device;
- a bottom wall configured to extend along at least a portion of a bottom of the mobile electronic device;
- a right side wall configured to extend along at least a portion of a right side of the mobile electronic device;
- a left side wall configured to extend along at least a portion of a left side of the mobile electronic device;
- a front opening configured such that a display of the mobile electronic device is visible through the front opening;
- a wireless receiver configured to extend across at least a portion of the back wall such that the wireless receiver is configured to be behind the back of the mobile electronic device, the wireless receiver configured to receive wireless signals; and
- a device interface electrically coupled to the wireless receiver by a flexible connector, wherein the device interface is movable relative to at least the bottom wall of the case between an engaged position and a disengaged position, wherein in the engaged position the device interface is configured to engage a corresponding interface on the mobile electronic device to deliver the electrical signals from the wireless receiver to the mobile electronic device, wherein in the disengaged position the device interface is configured to disengage from the corresponding interface on the mobile electronic device to facilitate insertion of the mobile electronic device into the case or removal of the mobile electronic device from the case, and wherein the device interface in the disengaged position is movable by bending the flexible connector to expose the corresponding interface of the mobile electronic device.

2. The wireless case of claim 1, wherein the wireless receiver is configured to receive a wireless charging signal such that the device interface delivers electrical power to the mobile electronic device based on the wireless charging signal.

3. The wireless case of claim 1, wherein the wireless receiver comprises a wireless charging receiver coil.

4. The wireless case of claim 1, wherein the wireless receiver moves with the device interface as the device interface moves between the engaged position and the disengaged position.

5. The wireless case of claim 1, wherein the device interface slides in a direction away from the top wall to move to the disengaged position, and wherein the device interface slides in a direction towards the top wall to move to the engaged position.

6. The wireless case of claim 1, further comprising an opening through the bottom wall, wherein the device interface passes through the opening in the bottom wall to move from the engaged position to the disengaged position.

7. The wireless case of claim 1, wherein the case comprises an interior area between the back wall, the front opening, the top wall, the bottom wall, the right side wall, and the left side wall, and wherein the device interface is positioned outside the interior area when in the disengaged position.

8. The wireless case of claim 1, wherein the case provides access for an external interface to engage the corresponding interface of the mobile electronic device when the device interface is in the disengaged position.

9. The wireless case of claim 1, wherein one or more of the back wall, the top wall, the bottom wall, the right side wall, and the left side wall is flexible such that the mobile electronic device can pass through the front opening and be securely disposed within the wireless case.

10. The wireless case of claim 1, wherein the wireless case is configured to house a smartphone, and wherein the wireless case has an external shape that generally corresponds to an external shape of the smartphone.

11. The wireless case of claim 1, comprising an opening on a back side of the case that provides access to an actuator for moving the device interface from the engaged position to the disengaged position.

12. The wireless case of claim 11, wherein the actuator comprises a grip configured to be manipulated by a user's finger.

13. The wireless case of claim 1, wherein the wireless receiver is removable and reinsertable through the front opening.

14. The wireless case of claim 1, wherein the device interface is removable and reinsertable through the front opening.

15. The wireless case of claim 1, further comprising one or more guides that define a direction of motion and/or range of motion for the device interface.

16. The wireless case of claim 1, wherein the back wall comprises one or more tabs and wherein a housing containing the wireless receiver comprises one or more slots that allow the one or more tabs to pass therethrough.

17. The wireless case of claim 1, wherein a housing contains the wireless receiver, wherein the back wall comprises a recess for receiving the wireless receiver, wherein the recess is larger than the housing to permit the wireless receiver and housing to move with the device interface.

18. The wireless case of claim 1, wherein the wireless receiver is positioned forward of the back wall so that the wireless receiver is between the back wall and the back of the mobile electronic device when the mobile electronic device is in the case.

19. A system for transferring wireless signals to or from a mobile electronic device, the system comprising:

a case configured to at least partially enclose the mobile electronic device;

a wireless antenna external to the case so that the wireless antenna is between a back of the mobile electronic device and the case when the mobile electronic device is in the case; and a device interface electrically coupled to the wireless antenna and configured to engage a corresponding interface on the mobile electronic device;

wherein one or both of the device interface and the wireless antenna is movable relative to the case;

wherein the wireless antenna and the device interface are coupled by a flexible connector; and wherein the device interface is movable by bending the flexible connector to expose the corresponding interface on the mobile electronic device through the case, such that an external interface can engage the corresponding interface on the mobile electronic device.

20. The system of claim 19, wherein the system is configured for wireless charging of a battery of the mobile electronic device.

21. The system of claim 19, wherein the wireless antenna is a wireless charging receiver coil.

22. The system of claim 19, wherein the wireless antenna is movable with respect to the case.

23. The system of claim 19, wherein the wireless antenna is disposed in a housing, wherein the case comprises a recess configured to receive the wireless antenna and housing, and wherein the recess is larger than the housing so that the housing and wireless antenna can move within the recess.

24. The system of claim 19, wherein the device interface is movable between an engaged position and a disengaged position.

25. The system of claim 24, wherein the wireless antenna moves with the device interface between the engaged position and the disengaged position.

26. The system of claim 24, wherein the device interface moves through an opening through the case when moving from the engaged position to the disengaged position.

27. The system of claim 24, wherein at least a majority of the device interface is positioned inside an interior area of the case when in the engaged position, and wherein at least a majority of the device interface is positioned outside of the interior area of the case when in the disengaged position.

28. The system of claim 19, wherein at least a portion of the case is flexible.

29. The system of claim 19, wherein the case is configured to house a smartphone, and wherein the case has an external shape that generally corresponds to an external shape of the smartphone.

30. The system of claim 19, wherein an opening through the case provides access to an actuator configured to move the device interface.

31. The system of claim 30, wherein the actuator is configured to be engaged by a user's finger to pull the device interface out of the corresponding interface on the mobile electronic device.

32. The system of claim 19, wherein one or both of the device interface and the wireless antenna is movable relative to a bottom wall of the case that is configured to extend along a bottom portion of the mobile electronic device.

* * * * *